US012811963B2

(12) United States Patent
Costante

(10) Patent No.: US 12,811,963 B2
(45) **Date of Patent: *Nov. 24, 2026**

(54) ATTRIBUTE-BASED POLICIES FOR INTEGRITY MONITORING AND NETWORK INTRUSION DETECTION

(71) Applicant: FORESCOUT TECHNOLOGIES, INC., San Jose, CA (US)

(72) Inventor: Elisa Costante, Eindhoven (NL)

(73) Assignee: FORESCOUT TECHNOLOGIES, INC., San Jose, CA (US)

( * ) Notice: Subject to any disclaimer, the term of this patent is extended or adjusted under 35 U.S.C. 154(b) by 168 days.

This patent is subject to a terminal disclaimer.

(21) Appl. No.: 18/623,265

(22) Filed: Apr. 1, 2024

(65) Prior Publication Data

US 2024/0340299 A1 Oct. 10, 2024

Related U.S. Application Data

(63) Continuation of application No. 18/122,919, filed on Mar. 17, 2023, now Pat. No. 11,949,704, which is a (Continued)

(30) Foreign Application Priority Data

Mar. 8, 2018 (NL) ...................................... 2020552
Mar. 20, 2018 (NL) ...................................... 2020632

(Continued)

(51) Int. Cl.
*H04L 9/40* (2022.01)

(52) U.S. Cl.
CPC ...... *H04L 63/1425* (2013.01); *H04L 63/0236* (2013.01); *H04L 63/1416* (2013.01); *H04L 63/145* (2013.01); *H04L 63/20* (2013.01)

(58) Field of Classification Search
CPC ............. H04L 63/1425; H04L 63/0236; H04L 63/1416; H04L 63/145; H04L 63/20

(Continued)

(56) References Cited

U.S. PATENT DOCUMENTS 8,844,033 B2 * 9/2014 Song ........................ H04L 67/02
726/25
9,846,780 B2 * 12/2017 Tonn .................. H04L 63/1441

(Continued)

FOREIGN PATENT DOCUMENTS

EP 1986391 A1 * 10/2008 ......... H04L 63/1416
JP 2014522167 A 8/2014

(Continued)

OTHER PUBLICATIONS

Notice of Acceptance for Australian Patent Application No. 2019232391, mailed on Jun. 6, 2024, 3 pages.

(Continued)

*Primary Examiner* — Badri Narayanan Champakesan
(74) *Attorney, Agent, or Firm* — Womble Bond Dickinson (US) LLP

(57) ABSTRACT

A method of detecting anomalous behaviour in data traffic includes parsing data traffic to extract protocol field values of a protocol message of data traffic, deriving attribute values of attributes of one of the first host, the second host, and the link. The method includes selecting a model relating to the one of the first host, the second host, and the link. The mode includes at least one semantic attribute expressing a semantic meaning for the first host, the second host, or the link. The method further includes updating the selected model with the derived attribute values, assessing whether the updated model complies with a set of attribute-based policies defining a security constraint of the data communication network, and generating an alert signal in case the (Continued)

attribute-based policies indicate that the updated model violates at least one of the attribute-based policies.

19 Claims, 10 Drawing Sheets

Related U.S. Application Data continuation of application No. 16/975,561, filed as application No. PCT/NL2019/050147 on Mar. 7, 2019, now Pat. No. 11,641,370.

(30) Foreign Application Priority Data

Mar. 20, 2018 (NL) ...................................... 2020633
Mar. 20, 2018 (NL) ...................................... 2020634
Mar. 20, 2018 (NL) ...................................... 2020635

(58) Field of Classification Search
USPC .......................................................... 726/23
See application file for complete search history.

(56) References Cited

U.S. PATENT DOCUMENTS

| | | | | |
|---|---|---|---|---|
| 10,122,740 | B1* | 11/2018 | Finkelshtein | H04L 63/1441 |
| 10,375,143 | B2* | 8/2019 | Pevny | H04L 63/1425 |
| 2011/0167493 | A1* | 7/2011 | Song | H04L 63/1466<br>726/23 |
| 2014/0297572 | A1* | 10/2014 | Zambon | G06F 21/50<br>706/12 |
| 2016/0006753 | A1* | 1/2016 | McDaid | H04W 12/128<br>726/23 |
| 2017/0104775 | A1* | 4/2017 | Vasseur | H04L 63/1425 |
| 2017/0163666 | A1* | 6/2017 | Venkatramani | H04L 63/1416 |
| 2017/0195197 | A1* | 7/2017 | Zambon | H04L 43/18 |
| 2017/0208079 | A1 | 7/2017 | Cammarota et al. | |
| 2018/0234385 | A1* | 8/2018 | O'Neil | H04L 41/145 |
| 2020/0125048 | A1* | 4/2020 | McKee | H04L 63/20 |

FOREIGN PATENT DOCUMENTS

| | | | |
|---|---|---|---|
| JP | 2020-546891 | | 9/2020 |
| JP | 2021-515498 | A | 6/2021 |
| JP | 7654404 | B | 3/2025 |

OTHER PUBLICATIONS

Office Action for Japanese Patent Application No. 2020-546891, mailed Oct. 17, 2024, 4 pages.
Transmittal of the International Search Report and Written Opinion of the International Searching Authority mailed on Feb. 13, 2020, for PCT/NL2019/050147, filed Mar. 7, 2019, 13 pages.
Garcia-Teodoro, P. et al. (Feb. 1, 2009). "Anomaly-based network intrusion detection: Techniques, systems and challenges", Computers & Security 28:18-28.
Transmittal of International Preliminary Report on Patentability mailed on Sep. 8, 2020, for International Application No. PCT/NL2019/050147, filed Mar. 7, 2019, pp. 10.

* cited by examiner

| Hosts DB | | | | | |
|---|---|---|---|---|---|
| Host | OS | IP | vendor | role | ... |
| A | windows | 10.10.1.1 | ? | SCADA | |
| B | windows | 10.10.1.2 | Dell | Terminal | |
| C | linux | 10.10.2.3 | Dell | DNS | |
| D | proprietary | 172.1.41.5 | Siemens | PLC | |

| Link DB | | | | | | |
|---|---|---|---|---|---|---|
| Source | Target | Proto | Port | Message type | Link type | ... |
| A | B | SMB | 139 | read file | cross-network | |
| B | A | SMB | 139 | open file | cross-network | |
| A | D | Modbus | 502 | read value | local | |
| A | D | STEP7 | 53 | reprogram | local | |
| A | C | DNS | 60 | solve name | local | |

Figure 5

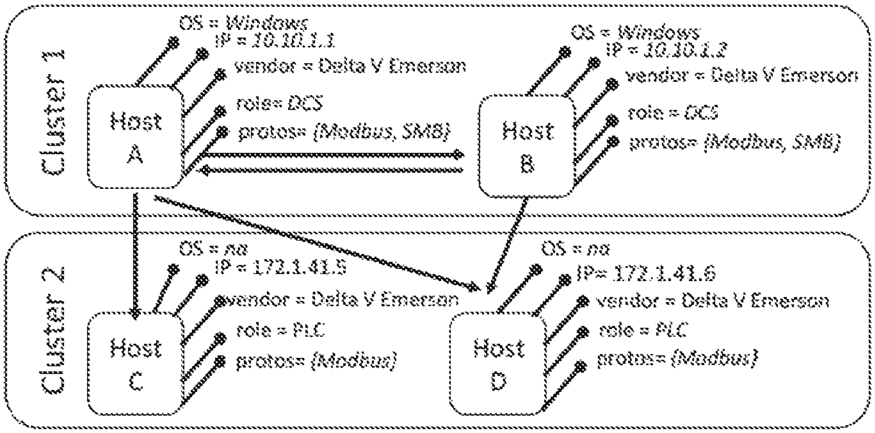
| ID | Consistency rule |
|---|---|
| 1 | If host.role ⊂ {PLC} then host.protos ⊂ {Modbus} |
| 2 | If host.role ⊂ {PLC} then host.role ⊂ {Moster, RTU} |
| 3 | If host.OS == Windows then host.vendor ⊂ {Dell} |
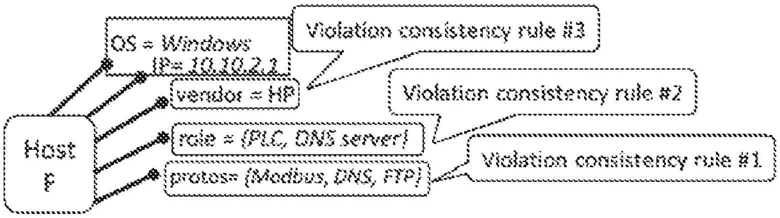
Figure 7

| Network traffic dataset | | | | | | | | | | |
|---|---|---|---|---|---|---|---|---|---|---|
| ID | $L.H_{Src}$.OS | $L.H_{Src}$.vendor | $L.H_{Src}$.role | $L.H_{dst}$.OS | $L.H_{dst}$.vendor | $L.H_{dst}$.role | L.Proto | L.DstPort | L.Message Type | ... |
| 1 | windows | Dell | Terminal | windows | Dell | Terminal | SMB | 139 | read file | ... |
| 2 | windows | Dell | Terminal | windows | Dell | Terminal | SMB | 139 | open file | ... |
| 3 | windows | Dell | SCADA | proprietary | Siemens | PLC | Modbus | 502 | read value | ... |
| 4 | windows | Dell | SCADA | proprietary | Siemens | PLC | STEP7 | 53 | reprogram | ... |
| ... | ... | ... | ... | ... | ... | ... | ... | ... | ... | ... |

Figure 8

| Quarantine | | | | | |
|---|---|---|---|---|---|
| ID | Target (G) | Support legit ($Hyp_0$) | Support malicious ($Hyp_1$) | Evidence (E) | Traffic (M) |
| 1 | Host={id = 1,..} | 0.60<br>0.80<br>0.81<br>1.00 | 0.00<br>0.00<br>0.00<br>0.00 | New Host<br>New Host Attribute Value (role = PLC)<br>New Host Attribute Value (vendor= ABB)<br>User feedback (host is legit) | ... |
| 2 | Link={ id=3, L.H.src.id = 2 L.H.dst.id =1,..} | 0.00<br>0.00<br>0.00<br>1.00 | 0.25<br>0.70<br>0.90<br>0.00 | New Link (from host 2 (role=terminal) to host 1 (role =PLC))<br>New Link Attribute Value (L.MessageType = reprogram)<br>Alert (terminal reprograms PLC)<br>User feedback (Terminal can reprogram PLC) | ... |
| 3 | Link= {id=2, H.src.id = 1 H.dst.id =15, ...} | 0.50 | 0.10 | New Link Attribute Value (L.MessageType=read) | ... |
| ... | ... | ... | ... | ... | ... |

Figure 10

ATTRIBUTE-BASED POLICIES FOR INTEGRITY MONITORING AND NETWORK INTRUSION DETECTION

RELATED APPLICATIONS

This application is a continuation of U.S. patent application Ser. No. 18/122,919, filed Mar. 17, 2023, which is a continuation of U.S. patent application Ser. No. 16/975,561, filed Aug. 25, 2020, which issued as U.S. Pat. No. 11,641,370, on May 2, 2023, which claims priority to PCT International Application No.: PCT/NL2019/050147, filed Mar. 7, 2019, which claims priority to NL Patent Application No. 2020552, filed Mar. 8, 2018, which claims priority to NL Patent Application No. 2020632, filed Mar. 20, 2018, which claims priority to NL Patent Application No. 2020633, filed Mar. 20, 2018, which claims priority to NL Patent Application No. 2020634, filed Mar. 20, 2018, which claims priority to NL Patent Application No. 2020635, filed Mar. 20, 2018, which are hereby incorporated by reference in its entirety.

TECHNICAL FIELD

The present invention relates to a method of detecting anomalous behaviour in data traffic on a data communication network and an intrusion detection system configured to perform the method.

BACKGROUND

A data communication network, also identified as a computer network, may be understood as a group of possibly heterogeneous devices (e.g. personal computers, tablets, phones, servers, controllers, actuators) that are connected together and can exchange data with each other over a communication channel. Companies rely more and more on computer networks to develop and maintain their core business. Likewise, Industrial Control Systems (ICS) are also increasingly adopting Information Technology (IT) technologies to improve the efficiency of their processes. Although this trend improves efficiency and business possibilities, it also increases the exposure to cyber-attacks. Intrusion Detection system (IDS) are widely-deployed security tools used to detect cyber-attacks. A network-based IDS (NIDS) relies on the analysis of network traffic for its detection technique.

Typically, a network monitoring system, such as a Network Intrusion Detection System can be distinguished in: i) blacklisting systems and ii) whitelisting systems.

Blacklisting systems maintain a database of well-known attacks and raise an alert when malicious network events that match a known attack are detected. These systems have the advantage of exhibiting very few false positives. On the other hand, blacklisting systems are limited in the sense that they can only detect well-known attacks for which a well-defined specification is available. This means they are unable to detect 0-days attacks, namely attack that exploits vulnerabilities still unknown. Further, the number of signatures that must be managed and checked increases with the number of attacks.

On the other hand, whitelisting systems maintain a model of the normal behavior of a system and compare the current activities with it: in case a mismatch occurs, an alert is raised. Whitelisting solutions are becoming quite popular since they have the great potential of detecting both known and unknown attacks. Unfortunately, they typically generate a high number of false positives which are expensive to handle. Typically, whitelisting NIDSes adopt an approach where a model of normal behavior is created (e.g. automatically learned or manually specified) over a few weeks' time period while the detection (that uses such model) goes on forever. This general approach to whitelisting may lead to the following problems.

There is no structured way to deal with legitimate changes caused by the intrinsic dynamism of any monitored network where things keep changing, legitimate behavior evolves and new legitimate devices might appear. This lack of adaptability causes two issues: (i) every (legitimate) change generates false positives which are expensive to handle since they require operators' manual inspection; and (ii) the model used by the whitelisting system needs to be manually updated for each (legitimate) change in the monitored traffic, an expensive and complex process. Some of the existing solutions allow for small manual updates to the model over time but generally any behavior outside the model would trigger an alert.

The invention aims to provide an anomalous behavior detection that may be adapted more easily to changes, e.g. upgrades, in the network.

According to an aspect of the invention, there is provided a method of detecting anomalous behaviour in data traffic on a data communication network, a first host and a second host being connected to the data communication network, the data traffic on the data communication network providing a link (e.g. forming a network communication) between the first host and the second host, the method comprising:

a) parsing the data traffic to extract protocol field values of a protocol message of the data traffic;
b) deriving, from the extracted protocol field values, attribute values of attributes of one of the first host, the second host, and the link;
c) selecting from a set of models, a model relating to the one of the first host, the second host, and the link, wherein the selected model comprises a plurality of attributes to describe the one of the first host, the second host, and the link, wherein at least one of the attributes is a semantic attribute, the semantic attribute expressing a semantic meaning for the one of the first host, the second host, and the link,
d) updating the selected model with the derived attribute values, if the derived attribute values are not featured upon selection in the selected model relating to the one of the first host, the second host and the link;
e) assessing if the updated, selected model complies with a set of attribute based policies, each attribute based policy of the set of attribute based policies defining a security constraint of the data communication network based on at least one of the attributes of the first host, the second host or the link, and
f) generating an alert signal in case the attribute based policies indicate that the updated selected model violates at least one of the attribute based policies.

On the data communication network, data communication takes place between a first host and a second host. The connection between the first host and the second host forms a link between the hosts. The hosts may be any device capable of data communication, such as computers, mobile telephones, wireless devices, programmable devices such as Programmable Logic Controller (PLC), or any other device. The hosts may take any possible role, such as a server, a client, a printer, a camera, a PLC, an Human Machine Interface (HMI), a Supervisory Control And Data Acquisition (SCADA) server, etc. The hosts may be a sender or a receiver in the data communication, or both a sender and a receiver. The data communication network may be any data communication network, such as a wired or wireless network and may make use of any type of communication protocol. The data communication (the link) between the first host and the second host may be a one-to-one link, or a one-to-many, such as may be the case when broadcasting data from a first host to plural second hosts.

The terms data traffic, link, network message, network message field, attribute, host model, link model, model update, attribute based policy and alert may be defined as follows:

- data traffic: data traffic (or network traffic) is the data moving across a network at a given point of time. Data traffic is mostly comprised of network messages.
- host: a network host, or simply host, is an element (computer or other device) connected to a network;
- link: a network communication taking place between two network elements. Typically, a link has a host source and a host target of the communication;
- network message (also identified as protocol message): an element of data traffic, typically an information unit that is transmitted by one host to another over a network;
- network message field (also identified as protocol message field): network messages are composed of several fields that carry the message information. To every field it is associated a length (in bit) for its representation, a value and a data type. For instance, source IP (32 bits or 128 bits, depending on the IP version either 4 or 6) and destination IP (32 bits or 128 bits, depending on the IP version either 4 or 6) are examples of fields in an IP message. The network message field may also be identified as a data field, a protocol data field or a protocol field. Correspondingly, the value of the protocol field may be identified as a protocol field value, a data field value or a protocol data field value. The term protocol message may also be identified as a message.
- attribute an attribute is a feature representing a host, a link or the contextual environment. The attribute is obtained by mapping one or several network message fields (possibly over several network messages at different points in time) to a more abstract category. The attributes describe protocol generic features, i.e. features in terms which are generic, thus not dependent of a specific protocol as may be applied. Accordingly, in an embodiment, the attribute values derived from the extracted protocol field values describe protocol generic features of the one of the first host, the second host and the link.
- host model: a list of attributes used to describe the host wherein preferably at least one attribute is a semantic attribute
- link model: a list of attributes used to describe the link wherein preferably at least one attribute is a semantic attribute
- model update: the process of mapping network message fields to the host- and the link-models. At every new network message, the model update process applies heuristics and/or aggregation and/or classification techniques to update the current host- and link-models by considering previous values of the attributes and the new information carried by the current network message.
- attribute-based policy: a statement in the form if-condition-then-action [obligation], where the condition contains attributes referring to the host and/or link models, the action defines what has to be done in case of a positive match of the policy with the data traffic (e.g., deny or permit) and obligation (optional) defines additional actions to be taken in case of a match (e.g., send email=name @domain.com, set priority=high, set criticality=medium). The attribute based policies define the condition and what has to be done in a protocol generic way, i.e. not specific to the protocol as may be applied in the communication on the data communication network, e.g. the communication between the first host and the second host via the link. The policy may be a declarative policy providing, e.g., a functional, logic description of the policy which is generic to the protocol(s) that may be applied. Accordingly, in an embodiment, the attribute based policies comprise declarative policies.
- whitelist policy: an attribute-based policy that describes acceptable data traffic (action==permit);
- blacklist policy: an attribute-based policy that describes unacceptable data traffic action=deny);
- alert: semantic-enriched and context-aware information that expresses a possible situation of danger of the system. For instance, an alert can express the fact a certain threat to the network has been identified.
- policy-check: the process of matching attribute-based policies against data traffic and take the action described by the policy in case of match.
- protocol: a set of rules and guidelines for communicating data. Rules are defined for each step and process during communication between two and more computers (hosts). Networks follow these rules to transmit data.

The data traffic is parsed, such as by a parser. The parser extracts protocol fields and their corresponding values from the data stream. The parser may relate to any suitable protocol language. The term parsing may be understood as an analysis by a computer of a sentence or other string of words into its constituents, resulting in a parser tree showing their syntactic relation to each other, which may also contain semantic and other information.

Network protocols may include, as non-limiting examples, one or more of the following: low-level protocols such as Ethernet frames, wireless (like Wireless Fidelity (WI-FI), Bluetooth or Long Term Evolution (LTE)) frames or serial-bus (RS-232/485, Controller Area Network (CAN) bus) frames; Internet Protocol (IP) headers; Transmission Control Protocol (TCP)/User Datagram Protocol (UDP)/Internet Control Message Protocol (ICMP)/Internet Group Management Protocol (IGMP) headers; higher-level protocols such as Hypertext Transfer Protocol (HTTP), Simple Mail Transfer Protocol (SMTP), Financial Information eXchange (FIX), Lightweight Directory Access Protocol (LDAP), Transport Layer Security/Secure Sockets Layer (SSL/TLS): protocols intended for carrying industrial data, such as Distributed Network Protocol 3 (DNP3), MODBUS/Transmission Control Protocol (MODBUS/TCP), MODBUS/Remote Terminal Unit (MODBUS/RTU), Building Automation and Control Network (BACnet), American National Standards Institute (ANSI) C12.22, IEC61850; and others.

Attribute values are derived from the extracted protocol field values. The attributes values may be derived from data (protocol fields) at any layer of the protocol. The attribute values express values of attributes. The attributes represent features of the first host, the second host and/or the link. For example, some of the attributes may relate to the first host, some of the attributes may relate to the second host and some of the attributes may relate to the link between the first host and the second host. The attributes values are protocol generic, i.e. the values form descriptions that are not specific to a certain protocol. For example, a read operation is formed by 4 in the Step 7 protocol, 45 in the International Electrotechnical Commission 104 (IEC-104) protocol, and 23, 3 in the Modbus protocol. The term read operation thus forms a protocol generic description of 4 in the Step 7 protocol, 45 in the IEC-104 protocol, and 23, 3 in the Modbus protocol. Hence the attribute values provide generic descriptions of the first host, the second host and the link.

Examples of host attributes are: operating system, vendor, role, firmware, model, applications, services, type of network.

Examples of link attributes are: protocol, source port, destination port, function, message type, payload parameters.

Plural models are provided. One of the models represents the first host, one of the models represents the second host and one of the models represents the link between the first host and the second host. Each model comprises a plurality of attributes, each model may be formed by a collection of attributes. The models may for example initially be empty Each model may be associated, by an identifier, with a particular host or a particular link. When data traffic has been parsed, providing attribute values of the first host, second host and/or link, the respective model that relates to the respective one of the first host, second host and link is updated by adding the attribute value, in case the attribute value is not featured in the respective model yet. Otherwise the model is left as is, or a level of confidence of the respective attribute value may be increased. The model of a host may include, but not being limited to, one or more of Internet Protocol (IP) addresses, Medium Access Control (MAC) address, MAC vendor, model, firmware, serial number, applications, ports, protocols, services, sent data, received data, role, operating system, first recorded activity, last recorded activity, network, criticality, sensitivity, owner, geographical location, labels, username, agent name, Uniform Resource Locator(s) (URL(s)), etc. The model of a link may include, but not being limited to, one or more of source port, destination port, Layer 1 protocol, Layer 2 protocol, Layer 3 protocol, Layer 4 protocol, Layer 7 protocol, message code, message type, number of connections, number of bytes, etc., where Layer refers to the ISO/OSI Layers.

The models are held against a plurality of attribute based policies. Each policy, i.e. each attribute based policy, may define an outcome in case a condition is met, the condition being defined in terms of one or more of the attributes of the first host, the second host and/or the link. The outcome of the attribute based policy relates to an allowability of the data traffic. Each attribute based policy thus defines security constraints on the basis of one or more host attributes and/or link attributes. For example, if one or more of the policies indicate unallowable behavior, an alert may be raised. One of the policies of the set of attribute based policies may define a security constraint based on at least one attribute of the first host, another one of the policies of the set of attribute based policies may define a security constraint based on at least one attribute of the second host, yet another one of the policies of the set of attribute based policies may define a security constraint based on at least one attribute of the link.

Examples of attribute based policies may comprise: a guest device may not send reprogram commends to the e-mail server. The printer device may not transmit a scanned document to an external e-mail server. The printer device may send operating status data to a remote maintenance printer server. A Windows computer may not act as an e-mail server. A Windows computer running a user profile may not have administrator rights. A Windows computer running an administrator profile may send an update command to an e-mail server. The policies may thus form whitelisting and/or blacklisting policies. The policies define conditions and actions in a protocol generic way. Although the above examples provide the policies in a generic description, them may be drafted in terms of if condition then action. For example, the policy "The printer device may not transmit a pdf document to an external e-mail server" may be noted as "If printer device transmits a pdf document to an external e-mail server" then "generate alert message". In this example, the printer device and the external e-mail server may form host attributes, while pdf document transmission may refer to link attributes. The set of policies may comprise policies relating to various hosts, links, etc. Thus, for a particular protocol message, a particular model, etc., only a subset of the attribute based policies may be relevant. The set of attribute based policies may define a security policy of the data traffic on the data communication network.

The outcome of the policies hence provides a result relating to the allowability of the data traffic. If the data traffic is found to be not allowable, an alert signal may be generated. The alert signal may form a warning transmitted to an operator, may form an alert message logged in a database, may form an optical warning (such as on a display) and/or an audible warning (such as a beep or other acoustical alarm) to a user/operator, etc.

The process of parsing, extracting protocol field values, deriving attribute values, building models, comparing against the attribute based policies and generating the alarm signal may be performed automatically, i.e. in an embodiment, the process does not require human intervention.

As the detecting of anomalous behavior is performed on the basis of attribute based policies, the criteria for data traffic to be allowable or not may be defined in terms of attribute values. Hence, the criteria may be defined at a higher level of abstraction, which may provide that the criteria as set by the policies not just apply to one specific device/circumstance, but may have a more general scope. The attribute based policies may apply rules at a higher level of abstraction, and may correspondingly judge events that occur, even when changes have been carried out in the data communication network.

For example, in case an attribute based policy holds that a printer/scanner may not forward a document to an external device, the policy may not just be applied to one specific printer/scanner, but may apply in any situation where a network host is recognized as being a printer/scanner, and a model being correspondingly updated based on the attribute values.

As another example, in case a policy defines that a reprogram command may not be sent from an external device to a PLC (i.e. may not be sent from a device external to a local network), then any host that is modelled as being a PLC may be subject to this policy. Thus, when the network is updated and a new PLC is connected, the policy may apply to this new PLC in case the attribute of being a PLC can be extracted from the new PLC also. Similarly, in case the new PLC appears to make use of a different protocol, e.g. appears to communicate using the IEC-104 protocol instead of for example the Modbus protocol, the existing policy may be applied, despite the fact that a similar operation may have a different coding in different protocols. Thus, in case the attribute based policy would define that a PLC may respond to a read operation only when the read operation has been sent from a local device, the policy may be applied even when a new PLC which communicates using a different protocol would be found in the network.

Thus, by building models of the host and link which define attributes of the host and link, attribute based policies may asses the allowability of the data traffic at a higher level of abstraction, enabling to define policies at a relatively high level of abstraction. Hence, the policies may be applicable when changes in the network have taken place, as similar or the same attributes may be extracted from data traffic, in the case of some changes to the network. Thus, making use of the attribute based policies for monitoring, intrusion detection, detecting anomalous behavior etc., may promote to detect an intrusion even when a certain degree of changes in the network have been carried out.

In the prior art the model of normal behavior is typically defined per single network entity (i.e. host) generally identified by its IP address. With this approach, the presence of a new host would be always initially considered a threat even though it might just be the result of a network upgrade. Although some NIDSs do support the creation of models for classes of elements (e.g., allow File Transfer Protocol (FTP) access to all File servers), the classes of elements need to be defined (and maintained) manually, an expensive and error-prone task. This means that it is not possible to define models for classes of similar elements or elements with similar behavior. This also means that, every time a new host is added to the network, it is necessary to define a new set of models that determine what is acceptable and what is not acceptable for the given host.

Furthermore, using attribute based policies allows a passive observation, thus not introducing additional data traffic and not disturbing a behavior of the hosts and the data network.

As attributes of the hosts and/or links may be used, a behavior (i.e. who does what?) may be observed, as the sender, receiver and the link between sender and receiver may be taken into account, and as the host and link attributes allow to define the policies in terms of behavior of the hosts.

The detecting of anomalous behavior may include one or more of: intrusion detection, discovering of network assets, characterizing network assets, identifying malicious activities by users, identifying malicious activities by network assets, etc. In an embodiment, the detecting of anomalous behavior provides for intrusion detection.

Applications may include the Internet of Things, Home Automation, Building Automation, Industrial Control Systems networks (oil & gas, electric-power generation, transmission and distribution, drinking and waste water, pharmaceutical/life sciences, chemical and petrochemical, entertainment, etc.), Industry 4.0 and manufacturing networks, office and IT networks, data center networks, in-car networks, car-to-x communications.

Some illustrative examples are provided below:

In an Internet of Things application, attribute extraction may be used to understand if a host is a blood pressure sensor, a step counter, a geo-location device and to detect intrusions or malicious activities by matching against attributes-based policies such as 'Patient's biometrics (ECG, heart rate, respiration rate and activity Level) can only be sent to authorized devices' or 'Wearable devices can only have outbound communications.

In a Home Automation application, attribute extraction may be used to understand if a host is a presence sensor, a fridge, an oven, a coffee machine, a thermostat, a smart phone etc., and to detect intrusions or malicious activities by matching against attributes-based policies such as 'A fridge cannot be connected to the Internet' or 'The oven can only be switched on or off from a known smart phone'

In a Building Automation application, attribute extraction may be used to understand if a host is a light, a thermostat, a controller, an IP-camera a card reader etc., and to detect intrusions or malicious activities by matching against attributes-based policies such as 'An IP-Camera cannot receive inbound communication' or 'A light cannot receive more than one switch on/off command per minute' or 'A controller can only be reprogrammed over a secure connection (e.g., Secure Sockets Layer (SSL), HyperText Transfer Protocol Secure (HHTPS))';

In an Industrial Control Systems application, attribute extraction may be used to understand if a host is a Supervisory Control And Data Acquisition (SCADA), a Programmable Logic Controller (PLC), an engineering workstation, an HMI, etc., and to detect intrusions or malicious activities by matching against attributes-based policies such as 'A PLC can only be reprogrammed by an engineering workstation' or 'a PLC can only be queried by a SCADA system';

In an Industry 4.0 and manufacturing application, attribute extraction may be used to understand if a host is a robot arm, a 3 Dimensional (3D) printer, a final product, a controller, a Distributed Control System (DCS), etc., and to detect intrusions or malicious activities by matching against attributes-based policies such as 'A robot arm can only receive commands from a DCS in the same network'

In an office and IT application, attribute extraction may be used to understand a host is a printer, a workstation, a virtual server, a rack server, a smart phone, an File Transfer Protocol (FTP) server, etc., and to detect intrusions or malicious activities by matching against attributes-based policies such as 'A printer can only receive print messages' or 'An FTP server can only receive files from workstation and not from smart phones'

In a car-to-x application, attribute extraction may be used to understand if a host is a vehicle, a traffic light, a controller, speed meter, a pedestrian, etc., and to detect intrusions or malicious activities by matching against attributes-based policies such as 'A traffic light can receive command only from a controller' or 'A vehicle can speak to another vehicle only to communicate its location'

In an embodiment, at least one of the attributes is a semantic attribute, the semantic attribute expressing a semantic meaning for the one of the first host, the second host, and the link. At least one of the attributes is a semantic attribute, the attribute value of the semantic attribute being a sematic attribute value, the semantic attribute expressing a semantic meaning for the host and/or link to which the sematic attribute relates.

The term semantic attribute may be understood as an implicit attribute, it may not be derived directly from a field of the protocol message. An attribute is implicit if it can only be derived by performing an analysis that could possibly involves multiple messages or multiple communications. Implicit attributes can be referred to as semantic attributes, since they allow the semantic-enrichment of the information we have about hosts and/or links. For instance, a host's role, its Operating System (OS) or its Criticality are example of implicit attributes. In fact, to derive the role of a host one should analyze multiple network activities, understand what layer 7 protocols it speaks, whether it only starts or also serves new connections, which ports are used involving that host, etc. In the same way, attributes such as the message type (e.g., whether the link represents a request for data, a command, a reprogramming action, etc.) or the link type (e.g., whether the link is between hosts in the same collision domain or it goes across networks) are examples of implicit attributes for the link.

Accordingly, the term semantic attribute may be defined as follows:

A semantic attribute is a feature representing a host, a link or the contextual environment that is obtained by mapping one or several network message fields (possibly over several network messages at different points in time) to a more abstract category. This representation leads to the creation of a high-level semantic model of network activities. For instance, the role of a host and the message type of a link are examples of semantic attributes: they can be obtained by looking at several message field values over several messages and help to reason over network activities with a higher level of abstraction. For instance, rather than saying IP 1 cannot communicate with IP 2 (low level of abstraction), one can say the PLC can only communicate with the SCADA or the coffee machine cannot communicate outside of the local network.

A semantic attribute may be described as an attribute which value cannot be extracted from a direct map to a protocol field value. The extracting of an attribute value of a semantic attribute may require to take into account for example the context, previous history, other protocol field values and/or other attributes value, in order to be able to assign a value to the semantic attribute. Examples of semantic attributes include but are not limited to:

- the role of a host (e.g., if it is a PLC, a master, a slave, a coffee machine, a printer, a workstation, a web server, etc.)
- the operating system of a host (e.g., if it is a Linux, a Windows, a proprietary operating system, etc.)
- the type of network of a host (e.g., if the host is in a public or private network, in an enterprise or control or field network, etc.)
- the vendor of a host (e.g., if it is a Cisco, a Siemens, a Dell device etc.)
- the criticality of a host (e.g., if it is a high, medium or low criticality asset)
- the operation of a link (e.g., if it is a Read, a Write, a Notify, a Reprogram, operation, etc.)
- the type of protocol of a link (e.g. if it is an operational, a vendor specific or an open protocol, etc.)
- the message type of a message Using semantic attributes, a higher level semantic model of network activities may be created, enabling to define the attribute based policies as semantic based policies, thus allowing to define the policies at a higher level of abstraction.

Attributes extraction may be described as to continuously and passively extract explicit and implicit attributes from the network traffic. Attributes can refer either to network assets, i.e., hosts, or to network communications, i.e., links. Attributes are derived by passively listening to the traffic, without injecting any additional traffic that although could help the analysis, could also disturb the normal operation of the network. The extraction of implicit attributes allows to enrich network events with semantic and contextual information. For instance, rather than having an event saying that IP1 speaks to IP2, thanks to the attributes extraction we can say we have seen a host of role Terminal speaking to a host of role PLC with a link containing a reprogramming message type. In turns, this opens the door to the writing of attribute-based detection policies.

Attribute-based policies may be described as to discern acceptable from non-acceptable network activities by relying on non-obvious, automatically extracted hosts and links attributes. An example of attribute-based policy is the following: 'Only hosts with role Engineering Workstations (EW) can send reprogram messages to host with Role PLC'. i) the attributes on which the policies is defined are automatically extracted from the network. This relieves the user from the burden of manually associating a role to each host; ii) using attribute-based rather than IP-based policies allow to write semantic-aware policies that, in a single statement, might encompass several hosts (i.e. all those matching the attributes of the policy); and iii) by using attributes, policies are expressed at a higher level of abstraction which increase their understandability and portability.

An example of the above described process of parsing, attribute extraction, model updating, holding the model(s) against attribute based policies, etc. is provided below.

Network traffic on a data network is monitored.

A host meta-model is provided which comprises the following attributes: {IP, operating system, vendor, role, firmware, type of network}. A link meta-model is provided which comprises the following attributes: {source IP, destination IP, protocol, source port, destination port, operation, number of occurrences}

A network link L1 from host H1 to host H2 is observed. The network traffic is parsed and the following protocol fields are extracted from the network message: {protocol name=Modbus, source IP=10.1.1.1, destination IP=10.1.1.2, source port=502, destination port=502, function code=16}

The host and link models related to respectively H1, H2 and L are selected. Assuming the models retrieved have the following current state:

- Model for H1={IP=10.1.1.1, operating system=?, vendor=Siemens, role=?, firmware=?, type of network=? } where the symbol '?' means there is no value for the attribute
- Model for H2={IP=10.1.1.2, operating system=?, vendor=Siemens, role=?, firmware=?, type of network=? }
- Model for L is empty since L1={source IP=?, destination IP=?, protocol=?, source port=?, destination port=?, operation=?, number of occurrences=0} where the symbol '?' means there is no value for the attribute Attribute values are extracted from the protocol field. For instance:

- attributes for H1={IP=10.1.1.1, role=master}. Note that the attribute role is a semantic attribute since it is extracted by (in the present example) relying on heuristics such as, 'if there is a Modbus link with function code equal to 16 from host Hx to host Hy, and the vendor for role Hy is equal to Siemens, then Hx has role equals to master while host Hy has role slave'
- attributes for H2={IP=10.1.1.2, role=slave}. Note that the attribute role is a semantic attribute since it is extracted by (in the present example) relying on heuristics such as, 'if there is a Modbus link with function code equal to 16 from host Hx to host Hy, and the vendor for role Hy is equal to Siemens, then Hx has role equals to master while host Hy has role slave'
- attributes for L1={source IP=10.1.1.1, destination IP=10.1.1.2, protocol=Modbus, source port=502, destination port=502, operation=change setpoint, number of occurrences=1}. Note that the attribute operation is a semantic attribute since it is extracted by (in the present example) relying on heuristics such as 'If there is a Link L where protocol name is equal to Modbus and function code is equal to 16 then the value for the semantic attribute operation is equal to 'change setpoint''

The selected models for H1, H2 and L are updated with the new attribute values. Hence:

Model for H1={IP=10.1.1.1, operating system=?, vendor=Siemens, role=master, firmware=?, type of network=? } where the symbol '?' means there is no value for the attribute Model for H2={IP=10.1.1.2, operating system=?, vendor=Siemens, role=slave, firmware=?, type of network=? } where the symbol '?' means there is no value for the attribute Model for L1={source IP=10.1.1.1, destination IP=10.1.1.2, protocol=Modbus, source port=502, destination port=502, operation=change setpoint, number of occurrences=1} where the symbol '?' means there is no value for the attribute It is assessed if the updated models comply with existing attribute-based policies. For instance, assuming that the attribute-based policy set consist of one policy saying that 'If the source host vendor is equal to Siemens and its role is equal to master and the destination host vendor is equal to Siemens, then the source host can send 'change setpoint' operations to the host destination'. In this case the updated models comply with the policy hence no alert is generated.

Another example is provided below.

Network traffic on a data network is monitored.

A host meta-model comprises the following attributes: {IP, operating system, vendor, role, firmware, type of network}.

A link meta-model comprises the following attributes: {source IP, destination IP, protocol, source port, destination port, operation, number of occurrences}

A network link L2 from host H3 to host H4 is observed.

The network traffic is parsed.

The following protocol fields are extracted from the network message: {protocol name=Modbus, source IP=10.1.1.1, destination IP=10.1.1.2, source port=502, destination port=502, function code=16}

The host and link models related to respectively H1, H2 and L are selected. It is assumed the models retrieved have the following current state:

Model for H2={IP=10.1.1.1, operating system=?, vendor=Dell, role=?, firmware=?, type of network=? } where the symbol '?' means there is no value for the attribute Model for H3={IP=10.1.1.2, operating system=?, vendor=Dell, role=?, firmware=?, type of network=? }

Model for L2 is empty since L={source IP=?, destination IP=?, protocol=?, source port=?, destination port=?, operation=?, number of occurrences=0} where the symbol '?' means there is no value for the attribute Attribute values are extracted from the protocol field. For instance:

Attributes for H3={IP=10.1.1.1, role=?}. Note that the attribute role in this case is not assigned since the heuristic, 'if there is a Modbus link with function code equal to 16 from host Hx to host Hy, and the vendor for role Hy is equal to Siemens, then Hx has role equals to master while host Hy has role slave' is not met Attributes for H4={IP=10.1.1.2, role=?}. Note that the attribute role in this case is not assigned since the heuristic, 'if there is a Modbus link with function code equal to 16 from host Hx to host Hy, and the vendor for role Hy is equal to Siemens, then Hx has role equals to master while host Hy has role slave' is not met Attributes for L2={source IP=10.1.1.1, destination IP=10.1.1.2, protocol=Modbus, source port=502, destination port=502, operation=change setpoint, number of occurrences=1}. Note that the attribute operation is a semantic attribute since it is extracted by (in the present example) relying on heuristics such as 'If there is a Link L where protocol name is equal to Modbus and function code is equal to 16 then the value for the semantic attribute operation is equal to 'change setpoint''

The selected models are updated for H3, H4 and L2 with the new attribute values. Hence:

Model for H3={IP=10.1.1.1, operating system=?, vendor=Dell, role=?, firmware=?, type of network=? } where the symbol '?' means there is no value for the attribute Model for H4={IP=10.1.1.2, operating system=?, vendor=Dell, role=?, firmware=?, type of network=? } where the symbol '?' means there is no value for the attribute Model for L2={source IP=10.1.1.1, destination IP=10.1.1.2, protocol=Modbus, source port=502, destination port=502, operation=change setpoint, number of occurrences=1} where the symbol '?' means there is no value for the attribute It is assessed if the updated models comply with existing attribute-based policies. For instance, assuming the attribute-based policy set consist of one policy saying that 'If the source host vendor is equal to Siemens and the destination host vendor is equal to Siemens, then the source host can send 'change setpoint' operations to the host destination'. In this case the updated models does not comply with the policy hence an alert is generated.

In an embodiment, at least one semantic attribute value is derived from a combination of protocol field values obtained from at least two protocol messages transmitted over the data communication network at different points in time. Hence, the semantic attribute may be derived by observing a behavior and/or by combining data as transmitted at different points in time, thus to be able to derive attributes that cannot be derived from a single protocol field as such. For example, attributes relating to a behavior of a second host may be derived form a protocol message sent from the first host to the second host in combination with the response as sent from the second host to the first host. The semantic attributes derived at different points in time may hence allow to derive more attribute related information and/or to derive higher level abstractions from the information retrieved from the protocol data fields.

In an embodiment, the set of models comprises a model for the first host, a model for the second host and a model for the link, wherein each of the models comprises at least one semantic attribute. The models of a host respectively a link may be built using attribute values of semantic attributes of the host respectively the link. Accordingly, the models may be built taking semantic attribute values of semantic attributes into account. Using the semantic attributes, the models may be more informative, more generic, and the models may enable the creation of higher level of abstraction policies.

In an embodiment, the policies each define an outcome in case a condition is met, the condition being defined in terms of a respective at least one of the attributes having a defined attribute value, the outcome of the attribute based policies indicating if the selected model is allowable or not allowable. By writing down the policies in the form of a condition and an outcome in case the condition is met, the policies may conveniently be programmed and be amended when learning, combining, updating policies as will be described in further detail below. The outcome of the policy may for example comprise “allowable” or “not allowable” or “quarantine” or “log”, or “quarantine, log”.

In an embodiment, the condition of each policy comprises at least one semantic attribute value. Hence, each policy may have a higher level of abstraction, may be more easily understood/interpreted by a user, and may be more generic.

In an embodiment, b) comprises applying rules to the protocol field values, the rules assigning attribute values to attributes based on the protocol field values. Rules may allow to automatically assign attribute values on the basis of extracted protocol field values. An example of such a rule could be that hosts using the operating system “Linux” and having incoming messages of protocol Internet Message Access Protocol (IMAP) are to be assigned the attribute of having the role of an email server. The rules may be domain specific and may be provided based on domain specific knowledge.

In an embodiment, b) comprises direct mapping protocol fields on attribute values. Attributes may be derived by direct observation of network data traffic, Attributes such as IP address may be directly derived from the protocol field values.

In an embodiment, b) comprises applying a heuristic to the data traffic and deriving the semantic attribute value using the heuristic.

In another embodiment, b) comprises applying a classifier to the data traffic and deriving the semantic attribute value using the classifier.

The method may further comprise determining a level of confidence of the classifier and wherein the attribute value is only derived from the classifier when the level of confidence is above a predetermined confidence level. The attribute value obtained using the heuristic may in an embodiment have priority over the attribute value obtained using the classifier.

Each semantic attribute can be derived by applying either heuristics or classifiers. Typically, the results obtained by heuristics have priority over classifiers. An example of heuristic used to infer the attribute Role is as follows: “If a conversation using the Domain Name System (DNS) protocol is observed, then the target host of such link has role DNS server”. Clearly, several such heuristics can be put in place. In addition, heuristics can be global or local to a specific deployment (e.g., heuristics that are true only in a given sector). On the other hand, a classifier is a model that given a set of features as input is able to associate a value (or class) to an attribute as output. Classifiers are typically generated by applying machine learning algorithms to labeled datasets, namely datasets where the association between features and class is known. Later, these classifiers can be used to infer the class on un-labeled data. Generally, classifiers associate a confidence level to their guessing: to keep our attribute extraction component highly reliable, we only resolve the attribute if the class guessed by the classifier has a high level of confidence (e.g., more than 90%). Note that, it is possible that certain implicit attributes can stay unresolved for a certain time, e.g., until enough information to assess their value is available.

In an embodiment, no stimulus is injected into the data communication network. By passively listening to the data communication taking place on the network, no disturbance of the data communication on the network takes place. Thus, on the one hand no additional load is placed in the network, while on the other hand a better insight may be gained into the behaviour of the data communication network. As no stimuli are injected, it may take some time to gather desired information. Some messages may only be sent sporadically. Hence, the data traffic may be monitored over a relatively long period of time, e.g. hours, days, weeks, to extract the protocol field values that may enable to derive the attribute values as described.

In an embodiment, steps b), c), d) and e) are performed for the first host, for the second host and for the link, the set of models comprising a model relating to the first host, a model relating to the second host and a model relating to the link, the attribute based policies of the set of attribute based policies defining conditions in terms of the attributes of the first host, the attributes of the second host and the attributes of the link.

In an embodiment, the set of attribute based policies comprises whitelist policies, the outcome of the whitelist policies indicating if the selected model is allowable. Hence, the whitelist policies enable, in case of changes in the network configuration, such as updates, new devices, etc., if allowable behaviour is observed, as the attribute based models and attribute based policies may allow to define allowable behaviour at a high level of abstraction. Hence, legitimate changes, such as upgrades or legitimate new devices, may, using the attribute based policies, be found to show behaviour similar to the behaviour monitored for existing devices, respectively before the upgrade, thus may be found to exhibit similar or the same attributes, thus to comply with the whitelist policies. Hence, false alarms as a result of regular updates, upgrades, etc, may to a large extent be avoided.

In another embodiment, the set of attribute based policies comprises blacklist policies, the outcome of the blacklist policies indicating if the selected model is not allowable. Similarly to above, once a particular behaviour of a host has been defined as malicious, similar attacks or similar attempted attacks may provide that similar or the same attributes may be derived there from, allowing to detect possibly malicious activities, even if the activities do not literally correspond to the activities corresponding to the blacklist.

In case the model relating to the first host, the second host or the link cannot be matched to any of the attribute based policies, the data communication relating to the respective one of the first host, the second host and the link is stored in a quarantine.

The goal of the Attribute extraction component is to find as much information as possible about the monitored network, a single host, a communication link, etc., by continuously and passively monitoring the network traffic.

Attribute extraction can happen in different ways:

1. via an expert’s direct assignment: attributes are user-determined, through direct assignment (e.g., “host X has vendor equal to Honeywell and role equal to PLC version Y”) or through the use of rules “all PLC at location Y have value K for attribute Z”).
2. via direct network mapping: attributes can be derived by direct observation of network traffic (e.g., the IP address can be extracted from a specific network message field).
3. via heuristics and classifiers: there are rules mapping observables to attributes; where observables may be unsolicited (passive sniffing) or solicited (active discovery). Rules can be either created by an expert (heuristics) or extracted from the data with machine learning or data mining algorithms (classifiers).

Attributes can refer either to host or to communication links, and they can be either explicit or implicit. An explicit attribute can be directly observed, e.g., from network packets fields. For example, the MAC and the IP addresses are explicit host attributes since they are contained in specific fields of layer 2 datagrams and layer 3 packets. Likewise, the protocol, the port, or the source and target are examples of explicit attributes for a link. To extract explicit attributes, one can apply in-depth protocol inspection techniques. On the other hand, an attribute is implicit if it can only be derived by performing an analysis that could possibly involves multiple messages or multiple communications. Implicit attributes can be referred to as semantic attributes, since they allow the semantic-enrichment of the information we have about hosts and/or links. For instance, a host's role, its Operating System (OS) or its Criticality are example of implicit attributes. In fact, to derive the role of a host one should analyze multiple network activities, understand what layer 7 protocols it speaks, whether it only starts or also serves new connections, which ports are used involving that host, etc. In the same way, attributes such as the message type (e.g., whether the link represents a request for data, a command, a reprogramming action, etc.) or the link type (e.g., whether the link is between hosts in the same collision domain or it goes across networks) are examples of implicit attributes for the link.

The present invention may adopt a passive approach that extract attributes by passively sniffing network traffic. Using active probes has the main disadvantage of generating additional traffic that in environments with limited resources and strong constraints such as industrial networks might not be acceptable. In addition, by using a passive approach, the attribute extraction might not be so straightforward: the network events necessary to match a heuristics might never show up, hence the present invention may take countermeasure to address this inconvenience (e.g., by using machine learning techniques as described elsewhere in the present document).

The present invention may make use of the role (and the other attributes) to characterize the normal behavior of a host, and detects deviations from normality as possible infection (attacks). This means the present invention does not need to define malicious roles, since the violations of whitelist policies will automatically detect infections.

The present solution may infer implicit attributes based on characteristics of the traffic by adopting a passive rather than an active approach. Using active probes generates additional traffic that might not be acceptable in certain environments;

The present solution may apply an approach (heuristics and classifier) not only to infer role but to extract several implicit attributes (e.g., role, vendor, operating system, location, functionalities, and message type).

The present solution uses the role (and the other attributes) to characterize the acceptable behavior, then we detect deviations from normality as possible infection (attacks). This means the present solution does not need to define malicious roles, since the violations of whitelist policies will automatically detect infections.

The attribute-based policy detection aims to enforce policies based on explicit and implicit hosts and links attributes.

Attribute-based policies are used to express domain-specific security constraints. For instance, in industrial control system, typically only Engineering Workstations can change the logic of Programmable Logic Controller (PLC), while SCADA or DCS only issue commands to read or write PLC memory. This domain knowledge can be translated into attribute-based policies and an intrusion detection system can raise an alert in case a policy is violated. Example of attribute-based policies are as follows:

Only hosts with role Engineering Workstation are allowed to send a reprogram command to host with role PLC.

A reprogram command cannot be send during the night.

A reprogram command cannot be send over a cross-network link.

As can be seen, to express these policies, both host and link attributes are necessary. In addition, it is desirable to define a language that is simple to understand, highly expressive, able to identify conflicting policies and scalable with the increase of number of policies. Also, such language may be needed to be able to account for both positive and negative policies. In fact, positive policies permit the listing of a whitelist of acceptable behavior, while negative policies permit the definition of a blacklist of non-acceptable behavior.

A possible way that can be used to express policies is in form of if condition then action statements. Conditions can be Boolean conditions that can evaluate true or false and can be defined on link, hosts, or context attributes (e.g., time, location). Actions can be used to express whether the network activity is acceptable or not acceptable (e.g., allow or discard). In addition, policies can optionally have obligations (what to do in case the policy is matched). Example of obligations include send email to admin user Jeff, set priority to medium, set criticality to high.

Attribute-based policies can be created in two-ways, a) by an expert with domain knowledge and b) automatically from the raw traffic. In the first case, it is intended to provide visual aid to the human expert to craft policies. For instance, the user could pick objects and attribute from a graphical interface rather than writing the policy as a text. In the second case, is aimed at developing an algorithm that automatically learns policies from network data, leveraging the semantic enrichment provided by the attribute extraction component.

The Attribute-based policy P may be defined as follows:

Given a set of host—($A_H$), link—(A) and context-related ($A_C$) attributes $A=A_H \cap A_L \cap A_C=<a_1=v_{a1}, a_2=v_{a2}, \ldots, a_n=v_{an}>$ where $a_i \in A$ has value $va_i \in V_i$ with $i \in [1, n]$, we define an attribute-based policy as:

P=<if <ATTRIBUTE OP VALUE [{LOGICOP ATTRIBUTE OP VALUE}]> then ACTION [{, OBLIGATION}]> where:

ATTRIBUTE can be any host-, link- or context-based attribute $a_i \in A$;

OP can be any comparison operation (e.g., >, <, ≠, =, etc.);

VALUE is any value $va_i \in V_i$ the attribute $a_i$ can take;

LOGICOP is any logical operator (e.g., and, or, not)

ACTION defines what has to be done in case of a positive match of the policy (e.g., deny or permit)

OBLIGATION defines additional actions to be taken in case of a match (e.g., send email=name@domain.com, set priority=high, set criticality=medium).

Note that the argument of the if clause is an attribute-based Boolean expression that refine the applicability of the policy: meaning that only if the evaluation of the expression is true the action will be enforced. Also, since the formalism [ . . . ] indicates optional elements and { . . . } indicates repetition of elements, an attribute-based policy can have one or more attributed-based expressions (i.e., ATTRIBUTE OP VALUE) and zero or more obligation. At least one of the attributes in the if clause may be an implicit (i.e., semantic) attribute.

As such, attributes based policies may be used in Access Control (AC), where access to a resource is granted or not according to the attributes possessed by the requester. In access control, attributes are usually substantiated by certificates and according to how attributes are modeled, different languages have been proposed and adopted. However all the available solutions rely on the manual definition of attributes and no solution that defines attributed-based policies by relying on the automatic extraction of attributes from network data is available.

Thanks to the wide number of host and link attributes that may be taken into account, the policies as described in the present document can be much more fine-grain than traffic-flow based policies. For instance, while with flow-based policies one could only say that two hosts can exchange a certain number of bytes over a certain port, with the presently disclosed attribute-based policies one can express constraints that go much deeper, and that can say what kind of messages can or cannot be exchanged. For instance, one could say that PLC cannot be reprogrammed during the night, or that PLC cannot be reprogrammed over a cross-network link.

In the present invention, host and link attributes may be automatically extracted from the network traffic. This mean that no credentials mechanism needs to be in place to adopt the attribute-based policies.

According to the invention, attributes do not need to be manually set per each component since they can be automatically inferred from raw traffic by using the attribute extraction component.

The present invention combines the automatic and passive extraction of attributes from raw traffic with attribute-based policies to create semantic-aware policies to discern acceptable from malicious network activities. A single attribute-based policy can refer to several entities (all those sharing the same attributes). The attribute based policies are easy to write and understand.

In an embodiment, in case the model relating to the first host, the second host or the link cannot be matched to any of the whitelist policies, the data communication relating to the respective one of the first host, the second host and the link is stored in a quarantine. Storing the data traffic that does not comply to a whitelist policy in quarantine, allows to suspend judgement as to allowability of the data traffic. The data traffic as stored in quarantine may be applied to learn new policies and/or to update existing policies as will be described in more detail further below. The quarantine stores a list of hosts, links, or combinations of hosts and links for which no judgement has been made regarding the host respectively link being legit or malicious. Thus, the term quarantine may, in the present document, be understood as a quarantine listing, the quarantine listing providing a list of hosts and/or links for which no judgement has been made regarding the host respectively link being legit or malicious. The quarantine may be formed by a list of records identifying the host or link that is listed in the quarantine, and optionally a support to the hypothesis that the host or link listed in the quarantine is legit respectively malicious, optionally a list of events composing the evidence used to compute the support, and optionally a set of network messages related to the host or link that is listed in the quarantine.

In an embodiment, the method further comprises providing a consistency rule, the consistency rule defining consistent combinations of at least two attribute values of attributes of the model relating to the one of the first host, the second host and the link (e.g. the model relating to the one of first host, the second host, and the link), comprising verifying, on the basis of the values of the attributes derived from the monitored data traffic, if the monitored data traffic complies to the consistency rule, storing the data traffic relating to the one of the first host, the second host, and the link in a quarantine in case the data traffic (such as the data traffic relating to the one of first host, the second host, and the link) does not comply to the consistency rule.

Using the consistency rule, it can be verified if the attributes of a host are consistent with each other.

The consistency rule may accordingly be defined as a rule that defines acceptable attribute values or combination of attribute values in a host/link model. The consistency rules may on the one hand be applied to detect inconsistencies, before even applying existing attribute based policies. Thus, inconsistencies may be detected and the related data traffic may be stored in quarantine in case an inconsistency is detected. Furthermore, when updating the attribute based policies from the data traffic stored in quarantine, as will be described in more detail further below, the consistency rules may be used to avoid to introduce errors in the host/link models during the update process.

In an embodiment, the detecting, on the basis of the attributes derived from the monitored data traffic, if the monitored data traffic complies to the consistency rule, is performed before step e). Thus, data traffic may be handled accordingly, e.g. stored in quarantine, in case it appears that the consistency rules are not complied with.

In an embodiment, the consistency rule includes at least one of a time of occurrence of the data traffic and a location of occurrence of the data traffic. Hence, the consistency rules may take account of time and location thus allowing to refine the consistency rules.

In an embodiment, the consistency rule relating to the first host comprises an attribute of another host, preferably an attribute of the second host. Hence, the consistency rules relating to one host may take into account attributes of another host. For example, if the first host is a PLC and the second host is a PRINTER, then they cannot have the same value for the attribute NETWORK. In other words, PLCs and PRINTERs cannot be placed in the same network In an embodiment, a group of hosts is defined, wherein the method comprises determining if the host to which the attributes relate, is comprised in the group, and applying the consistency rule in case the host to which the attributes relate, is comprised in the group. Thus, consistency rules may be defined locally, e.g. relating to a group of e.g. similar hosts. The group may be defined using e.g. a clustering algorithm.

In an embodiment, the consistency rules are learned using machine learning, preferably using association rules. The consistency rules may be predefined, e.g. entered by an operator based on experience, security regulations, etc. Alternatively, the consistency rules may be learned from the data traffic.

Consistency rules can be of various types, such as:

general rules dictated by experience to e.g., identify combinations of attributes values that are not permitted (e.g., “a host cannot be at the same time a PLC and an Engineering workstation”, or “the role of a host cannot be terminal if the vendor is Honeywell”);

local rules to the particular site to e.g., identify combinations of attributes values that are necessary, (e.g., “all host with role equal to PLC have vendor equal to Honeywell" implying that if there is a host with attributes role equal to PLC and attribute vendor equal to Rockwell, this would be in violation of the rule;

may depend on security or governance policies, or on regulations;

may change over time, e.g., when the governance policy of a system can apply;

may depend on parameters of different kind, including time, location, and attributes of other hosts;

may be either global, i.e., the consistency rule applies to every host in the network, or local, i.e., the consistency rule is only true for a certain neighborhood, namely, a group of similar hosts. Clearly, to define a local rules it is necessary to define a metric for assessing the similarity between hosts and thus identify neighborhood of similar hosts (e.g., by using clustering algorithms).

In many cases, a consistency rule will be a function that maps the attributes of a host into the set consistent, inconsistent. More generally, a consistency rule is a function that maps all attributes of all hosts and their environment into a set of acceptable values. This gives an indication of the health or consistency state of the system at hand and it may also give an indication on actions that may be taken in case an inconsistency is identified. For instance, it could be useful to have rules mapping attributes into a set in which the members could be consistent, inconsistent, suspicious, problematic etc. Consistency rules can be either manually defined by an expert or inferred from the data. In the latter case, machine learning algorithms can be used (e.g., association rules) to distinguish normal from unusual combination of attributes.

Thus, applying consistency rules, the following may be achieved:

guarantee that the algorithm used to automatically extract attributes, does not put the system in a semantically invalid state.

apply consistency check to detect when an attribute is 'strange' not on its own but with respects to other attributes of the same host or of the same neighborhood.

machine learning techniques to distinguish normal from unusual values or combination of attributes values.

The terms quarantine, quarantine and detection algorithm, consistency rule, and inconsistency detection may be described as follows:

quarantine: the quarantine contains hosts and links that are in a limbo: the judgment of whether they are legit or not is suspended until there is not enough evidence to classify them. We represent the quarantine as a list of tuples containing the following elements:

- an identifier for the tuple;
- a target, namely the host or the link that is in quarantine, with the associated host/link model
- the support to the hypothesis 0 that the host/link in quarantine is legit;
- the support to the hypothesis 1 that the host/link in quarantine is malicious;
- the list of events composing the evidence used to compute the support. Events can be extracted from data traffic or can be generated by the system or provided by the user. Example of events can include: New Host, New Host Attribute Value, New Link, New Link Attribute Value, Alert, User feedback, etc.
- the data traffic corresponding to the host/link in quarantine.

detection and quarantine algorithm: the process to detect incident and quarantining hosts and/or links. The process works as follows:

- new data traffic is available,
- parse data traffic to extract host and link attributes
- select the corresponding hosts and/or link model(s)
- if there is no existing host/link model to associate with the data traffic, initialize the model and add the hosts and/or links to the quarantine.
- otherwise, check for attribute inconsistencies
- in case of inconsistency add the correspondent hosts and/or links to the quarantine
- otherwise match the network message with the attribute-based policies
- in case of match with a blacklist policy, raise an alert
- in case of match with a whitelist policy, do nothing
- in case the match cannot be evaluated (e.g., because not all the attributes in the correspondent host/link models are yet featured) then put the host and/or link in the quarantine consistency rule: a rule that defines acceptable attribute values or combination of attribute values in a host/link model. Consistency rules are used to avoid to introduce errors in the host/link models during the update process.

inconsistency detection: the process of identifying consistency rule violations;

Inconsistency detection to verify that the values of the attributes we use to characterize a host are not in a conflicting state. For instance, a host cannot have at the same time the operating system equal to Linux and the Vendor equal to ABB. Examples of consistency rules include the following: i) a combination of attributes values that is not possible, e.g., if Role is Terminal then Vendor cannot be Honeywell;

ii) a combination of attributes values that is necessary, e.g., if Role is PLC then the Vendor has to be Honeywell; iii) an attribute that has only certain values in a certain domain, e.g., Vendor is only Dell and Honeywell in a certain network; and iv) a combination of attributes values that is usual according to the attributes values of the neighborhood, e.g., all the hosts in a neighborhood only speak certain protocols. The present aspect prevents the algorithm used to extract hosts' attributes to put the model in a semantically invalid state. In addition, in case a malicious host is trying to mimic the behavior of a legit host, consistency check help to detect such misbehavior. This is because the malicious host cannot perfectly mimic another host (e.g., information about the vendor and the operating system are difficult to mimic). Hence, its mimic attempt will likely result in a consistency check violation.

In an embodiment, the method comprises learning the attribute based policy (e.g. learning at least one of a further attribute based policy and an attribute based policy of the set of attribute based policies) from the data traffic, the learning comprising:

monitoring the data traffic, deriving host attributes and link attributes from the monitored data traffic, transforming the data traffic into a dataset of attribute-based transactions, generating rules by taking into account a frequency of item sets of the host attribute values and link attribute values in the dataset, each one of the rules comprising an antecedent defining a condition and a consequent defining an action, determining for each rule a level of confidence that specifies how often the rule appears to be true, and a level of support that specifies how often the item set underlying the rule appears in the dataset, selecting rules based on the level of support and the level of confidence, translating the rules into the attribute based policy by defining the attribute-based policy condition by joining the antecedent and the consequent of the selected rules, and defining the attribute-based policy action based on the level of support and/or the level of confidence.

Policies may be learned e.g. in a learning phase. In the learning phase, (training) data traffic is provided and policies are learned from the (training) data traffic. The (training) data traffic may be formed by regular data traffic as observed during normal operation. Preferably, no stimuli are injected, i.e. the data traffic is gathered by passively listening to the communication taking place on the data communication network. Also, marking by an operator certain events as allowable or not allowable may be omitted as the policies may be learned in an automatized way.

The data traffic is monitored and attributes are extracted from the data traffic in a way as described above. The attributes may be direct and/or indirect (semantic) attributes. Host attributes as well as link attributes are extracted in order to have context available to enable the generation of meaningful policies. The attributes as extracted are stored as a dataset of attribute based transactions, in other words, instead of storing that a certain IP address sends code 0x0A to another IP address, it may be stored that a terminal of the vendor Dell using Windows as operating system sends a read from file message to another terminal of the vendor Dell using Windows as operating system, the link between the terminals using the SMB protocol. Thus, the attributes as derived from the data traffic for transactions, i.e. for network activities, are stored in the form of the dataset. The dataset is applied to generate rules. Thereto, machine learning may be applied to extract rules in the dataset. Association rules are derived from the dataset. The machine learning takes account of a frequency of item sets, i.e. a frequency of sets of attributes stored in the dataset. Thus, relations between items in the dataset may be discovered making use of the frequency of occurrence of such sets of items, i.e. set of attributes.

Each one of the rules comprises an antecedent defining a condition and a consequent defining an action, i.e. the action associated with the condition. Both the condition and the action are defined in terms of one or more of the attributes. For example, the condition may specify a certain protocol, while the action specifies a port (as it appears, from the data traffic, that the data traffic using the specific protocol usually makes use of that particular port).

For each rule, a level of confidence and a level of support is determined. The level of support defines how often an item set, i.e. a set of attributes underlying the rule, occurs in the dataset. The level of confidence defines how often the rule appears to be true, e.g. how often the rule appears to be true in the occurrences of the item set, i.e. the set of attributes underlying the rule, in the dataset. For example, a high level of confidence and a high level of support indicate that the item set underlying the rule appears in the data set relatively often (thus a high support) while in these occurrences of the item set in the data set, the rule appears to be true often (thus a high level of confidence).

Then, the level of confidence and the level of support are used to select rules. In order for a rule to be translated into a policy, the rule is required to have a certain level of support. For example, only rules with a certain minimum level of support (e.g. a predetermined threshold) are translated into a policy. The condition of the policy is formed from a combination of the antecedent and consequent of the rule. The outcome of the policy (e.g. allow, deny) is formed from the level of confidence. The rules that are often found to be true, i.e. with a high level of confidence may result in an allow action, while the rules that are true only in a low number of cases, i.e. with a low level of confidence may result in a deny action.

Thus, policies may be learned from the data traffic, whereby sets of attributes providing rules that are mostly true may provide attribute based policies defining allowable traffic and sets of attributes providing rules that are mostly not true may provide attribute based policies defining traffic that is to be denied. Accordingly, in an embodiment, the selecting rules based on the level of support and the level of confidence comprises:

selecting, for whitelist policies, rules having the level of confidence above a predetermined positive level of confidence and having the level of support above a predetermined level of support.

Similarly, in an embodiment, the selecting rules based on the level of support and the level of confidence comprises:

selecting, for blacklist policies, rules having the level of confidence below a predetermined negative level of confidence and having the level of support above a predetermined level of support.

The rules may be generated from the attributes using any machine learning and/or data mining technique. In particular, association rules and frequent items set extraction may be applied. Accordingly, in an embodiment, the generating rules from the host attributes and the link attributes comprises applying association rules to the host attributes and the link attributes.

Furthermore, the generating rules from the host attributes and the link attributes comprises applying frequent items set extraction to the host attributes and the link attributes. Frequent items set extraction may be understood as the extraction of items sets that occur frequently.

In an embodiment, the translating the rules into the attribute based policy further comprises:

reducing the number of policies by removing redundant policies, a policy being redundant if its condition includes the whole condition of another policy.

in case of conflict where two policies share the same condition while the two policies comprise different actions, remove the policy that has less support and confidence.

The number of policies as generated may be reduced, as redundant policies may be removed, assuming that the policies have a same action. In case of different actions, i.e. in case contradicting behaviour may occur, the policy that has less support and/or confidence may be removed.

learning of attribute-based policy may be described as the process of automatically extracting attribute-based policies from data traffic. The process consisting of the following steps:

1. extraction: capture data traffic from the network.
2. pre-processing: analyze data traffic and transform it into a dataset of attribute-based transactions;
3. rule mining: apply rule mining algorithms (e.g., association rules) to the dataset in order to extract association rules. Association rules are generated by taking into account the number of times that certain item set of attributes are observed together into the dataset. The support of a rule specifies how frequently an item set appears in the dataset, while the confidence (expressed in percentage) is an indication of how often the rule has been found to be true.

4. translation to policy: the rules generated by machine learning algorithms give an indication of what attributes are more often seen together (antecedent) and what they imply (consequent). This information needs to be translated into attribute-based policies in line with our definitions. For a rule to become a policy, in our method we have to decide what is the minimum confidence and support and whether a certain level of confidence and support lead to a positive (i.e., allow) or negative (i.e., deny) policy. For instance, let assume positive policies will be generated exclusively for rules with confidence higher than 99% and negative rules will be generated exclusively for rules with confidence lower than 1%.
5. policy reduction: some of the policies generated at the previous step can be redundant. A policy Px is redundant if its condition includes the whole condition of another policy Py and the action of the policy is the same. In such a case, Px can be removed.
6. policy conflict resolution: a policy Px is in conflict with a policy Py if they share the same condition to which correspond two different actions. To resolve the conflict, one of the two policies need to be removed. To decide which policy to remove, the conflict resolution process will take into account the confidence and the support of the rules that led to the conflicting policies.

Learning of attribute-based policies may be described as to automatically infer new policies by passively observing network traffic. We use learning techniques to automatically extract attribute-based policies. Human intervention—to define policies for distinguishing acceptable from non-acceptable behavior—is limited or not required.

It may automatically infer new policies by passively observing network traffic, e.g., by learning the relationships between certain attributes and certain behavior and automatically extract policies from this.

Attributes-based policies can be either defined by a human expert, in which case extensive knowledge about allowed and not allowed behavior is required, or inferred from the data with a learning approach. While the first approach is time consuming and error-prone, the second can be completely automatized and reduces the risks of error (e.g., duplicated or overlapping policies). The present invention proposes an automatic technique to overcome the laborious manual process of defining policies by deriving the policies from the observation of the network traffic flow. Specifically, we mine the whitelist policies from the observation of benign network messages, and the blacklist policies from the observation of network activities under attack (when possible).

TABLE 1

Association Rules Example

| ID | Confidence (%) | Antecedent | Consequent | Support (#) |
|---|---|---|---|---|
| 1 | 99.9 | L.Hsrc.Role = SCADA & L.Hdst.OS = Proprietary | L.MessageType = reprogram | 1500 |
| 2 | 100 | L.Hsrc.Role = SCADA | L.MessageType = reprogram | 1600 |
| 3 | 50 | L.Proto = SMB | L.DstPort = 139 | 850 |
| 4 | 0.7 | L.Proto = HTTP | L.DstPort = 815 | 2 |

Below, we describe an embodiment of the policy learning process:

1. extraction: capture traffic from the network. Network traffic (M) is a sequence of network messages $M=<m_1, m_2, \ldots, m_w>$;
2. pre-processing: network traffic is analyzed in order to extract host, link and context attributes and it is transformed into a dataset of transactions;
3. rule mining: rule mining algorithms (e.g., association rules) can be applied to the dataset in order to extract rules. Table 1 shows a small examples of association rules that can be generated by analyzing the dataset of transactions. Association rules are generated by taking into account the number of times that certain item set of attributes are observed together into the dataset. The support of a rule specifies how frequently an item set appears in the dataset, while the confidence (expressed in percentage) is an indication of how often the rule has been found to be true.
4. translation to policy: the rules generated by machine learning algorithms give an indication of what attributes are more often seen together (antecedent) and what they imply (consequent). This information need to be translated into attribute-based policies in line with our definitions. For a rule to become a policy, in our method we have to decide what is the minimum confidence and support and whether a certain level of confidence and support lead to a positive (i.e., allow) or negative (i.e., deny) policy. For instance, let assume positive policies will be generated exclusively for rules with confidence higher than 99% and negative rules will be generated exclusively for rules with confidence lower than 1%. In this case, rule 1 and rule2 in Table 1 will be translated into a positive policy (i.e., P1 and P2 below), while rule 4 will be translated into a negative policy (i.e., P3). Following, we present the policies obtained as translation of the rules in Table 1:

```
P1: <if
        L:Hsrc:role ==SCADA AND
        L:Hdst:os == proprietary AND
        L:messageType == reprogram
    then allow>
P2: < if
        L:Hsrc:role == SCADA AND
        L:messageType == reprogram
    then allow>
P3: <if
        L:Proto == HTTP AND
        L:DstPort ==815
    then deny >
```

5. policy reduction: some of the policies generated at the previous step can be redundant. A policy Px is redundant if its condition includes the whole condition of another policy Py and the action of the policy is the same. In such a case, Px can be removed. For instance, policy P1 in the previous example is redundant as it contains the whole condition of policy P2 and they share the same action. Hence, P1 can be removed.

6. policy conflict resolution: a policy Px is in conflict with a policy Py if they share the same condition to which correspond two different actions. For instance, in case we have a policy P1: <if L.Proto==HTTP AND L.DstPort==815 then deny> and a policy P2:<if L.Proto==HTTP AND L.DstPort==815 then allow> then P1 and P2 are in conflict. To resolve the conflict, one of the two policies need to be removed. To decide which policy to remove, the conflict resolution process will take into account the confidence and the support of the rules that led to the conflicting policies.

Accordingly, it is aimed to create policies that take context and semantic into account (e.g., not only the attributes of the link but also those of the source and destination hosts).

Since policies are expressed in a policy language that is able to detect and resolve conflict, we insure the system does not fall in an inconsistency status.

Association rules and frequent-item extraction algorithm cannot be applied as-is: In the present case some features need to be part of the precedent (or the antecedent). In addition, pre-cooked algorithm might have association rules with a variable number of attributes while we might want this number to be fixed. In addition, the output of association rules and frequent-item set might only serve as an input that needs to be translated into the actual policies.

In an embodiment, the set of attribute based policies comprises the whitelist policies, the outcome of the whitelist policies indicating if the selected model is allowable. In case the model relating to the first host, the second host or the link cannot be matched to any of the whitelist policies, the data communication relating to the respective one of the first host, the second host or link may be listed in a quarantine. Judgement may be suspended and further information may be gathered to decide about the host or link as listed in quarantine. For example, policies may be adapted based on the attribute values as gathered from the data traffic related to the host or link in quarantine, as described in more detail below. The quarantine stores a list of hosts, links or combinations of hosts and links for which no judgement has been made regarding the host respectively link being legit or malicious. Thus, the term quarantine may, in the present document, be understood as a quarantine listing, the quarantine listing providing a list of hosts and/or links for which no judgement has been made regarding the host respectively link being legit or malicious. The quarantine may be formed by a list of records identifying the host or link that is listed in the quarantine, and optionally a support to the hypothesis that the host or link listed in the quarantine is legit respectively malicious, optionally a list of events composing the evidence used to compute the support, and optionally a set of network messages related to the host or link that is listed in the quarantine.

In an embodiment, in case the network message (the protocol message) carries information about a host or link for which no model is available the respective host or link is listed in a quarantine.

The quarantine may hence be used to log activities relating to yet unknown hosts or links. The quarantine may be formed by a memory or memory part, where the network messages that relate to the host or link in quarantine may be stored for future analysis.

The method may further comprise: deriving attribute values relating to the host or link listed in the quarantine.

Hence, likewise to a known host or link, protocol field values are extracted from the protocol message and attribute values are derived from the protocol field values. The attribute values may relate to direct attributes as well as to semantic (indirect) attributes. The semantic attributes may be derived in the same or similar way as described above in relation to known hosts or links. Thus, a model for the unknown host or link may be formed based on the attribute values.

The method may further comprise: calculating, from the attribute values relating to the host or link listed in the quarantine, a support to a hypothesis that the host or link listed in the quarantine is legit, and calculating, from the attribute values relating to the host or link listed in the quarantine, a support to a hypothesis that the host or link listed in the quarantine is malicious. The support to the hypothesis may for example be formed by a probability that the hypothesis is true. The calculations may be performed using the attribute values of the host or link in quarantine, and may for example be performed by comparing a similarity of the attributes of the host or link in quarantine with the attributes of a known host or link.

The calculations may be repeated each time the attributes values of the host or link in quarantine are updated. Thus, the support to the hypotheses may be updated every time new evidence becomes available. Hence, as soon as sufficient support is derived from the attributes values to enable to declare the host or link in quarantine as malicious or legit, following steps may be taken as described below. Thus, yet unknown hosts or links may be assessed autonomously thereby possibly enabling to autonomously adapt to changes in the network Accordingly, the quarantine may comprises, i.e. store, for the hosts and/or links listed in the quarantine:

- an identification of the host or link,
- a list of known attribute values of the host or link,
- a support to a hypothesis that the host or link is legit,
- a support to a hypothesis that the host or link is malicious,
- an identification of data traffic used to determine the support to the hypotheses.

In an embodiment, the method further comprises: checking using the consistency rules, the attribute values of the host or link in quarantine for consistency. The same consistency rules as described above may be applied to the hosts or links in quarantine. Using the consistency rules, potentially malicious activities may be recognized at an early stage, i.e. even before the hypothesis to the fact that the host or link stored in quarantine is malicious, has reached a sufficiently high level. Thus, malicious activities may be recognized at an early stage.

In an embodiment, the method further comprises: assessing, using the attribute based policies, if the attribute values of the host or link in quarantine comply with the set of attribute-based policies. The existing attribute based policies may hence be applied to the attribute values of the host or link in quarantine. The outcome of holding the attribute values of the host or link in quarantine against the attribute based policies may provide for evidence that the host or link in quarantine is legit or malicious. The outcome may be used as evidence in the determination of the support to the hypotheses that the host of link in quarantine is legit respectively malicious. Thus, when assessing the new host or link in quarantine, existing attribute based policies may be taken into account. In case a blacklist policy is violated, a corresponding alert may be raised.

In an embodiment the method further comprises: deriving an attribute based policy or attribute based policies from the host attributes and link attributes of the data traffic stored in the quarantine, e.g., deriving the attribute based policy respectively policies from the attributes of the host or link listed in the quarantine. Once the hypothesis that the host or link stored in quarantine is legit respectively malicious has been found to exceed a threshold, the attribute values of the host or link in quarantine may be used to learn new polices and/or to update existing policies. Thereto, the same or similar learning mechanisms may be applied as described above in relation to the learning phase. Hence, a self-updating intrusion detection may be provided which learns new polices from the data stored in quarantine. Thus, the intrusion detection system may on the one hand avoid unnecessary alarms in that legitimate updates/changes relating to the data network may result in new or updated whitelist policies. On the other hand, malicious activities that have not been noted before, i.e. for which no specific blacklist policy is available yet, may be lead to new or updated blacklist policies. As described above, white the potentially malicious activity is still in quarantine for collection of attributes, evidence and assessment, an alarm may already be raised based on either an inconsistency rule or based on an existing blacklist policy. Thus, during the time that the malicious activity is in quarantine, actions may already be taken (e.g. by a human operator triggered by an alarm signal or by the intrusion detection system autonomously blocking related data traffic) to mitigate a risk of potential malicious actions taking place.

According to an aspect of the invention, frequently occurring behaviour may result in whitelist policies. Thus, when behaviour of a host or link in quarantine occurs frequently, this may, according to an aspect of the invention, be considered as indication that the behaviour is legitimate. Accordingly, a new whitelist policy may be derived from attribute values derived from protocol messages relating to the host or link in quarantine, wherein a frequency of occurrence of the protocol messages relating to the host or link in quarantine exceeds a whitelisting threshold. Hence, the intrusion detection may relatively easy adapt to legitimate changes, upgrades, etc., based on the insight that legitimate changes, upgrades, etc., may result in new behaviour that occurs relatively frequently. A detection threshold may be applied, i.e. an e.g. predetermined whitelisting threshold that expresses a frequency of occurrence above which legitimate behaviour may be assumed. Frequently occurring behaviour may be qualified as whitelist if a similarity with whitelist models or whitelist policies exceeds a similarity threshold.

In particular, the deriving attribute based polices from the host attributes and link attributes of the data traffic stored in the quarantine may comprise:

- (re)computing the support to the hypothesis that the host or link in the quarantine is legit or malicious when data traffic related to host and/or links in quarantine is observed
- If the support to the hypothesis that the host or link in quarantine is legit exceeds a whitelist threshold, removing the host or link from the quarantine and use the data traffic related to the host or link to extract new whitelist policies
- If the support to the hypothesis that a host/link in quarantine is malicious exceeds a blacklist threshold, raising an alert and using the data traffic related to the host or link to extract new blacklist policies
- updating the current policies using the extracted new whitelist or blacklist policies.

Once it has been found that the support to the hypothesis that the host or link is legit exceeds a whitelisting threshold, i.e. a threshold indicating that the hypothesis that the host is link is legit exceeds an (e.g. predetermined) threshold level, the host or link may be removed from quarantine and new (whitelist) policies may be learned and/or existing policies updated using the techniques described above.

Similarly, once it has been found that the support to the hypothesis that the host or link is malicious exceeds a blacklisting threshold, i.e. a threshold indicating that the hypothesis that the host is link is malicious exceeds an (e.g. predetermined) threshold level, an alert may be raised and new (blacklist) policies may be learned and/or existing policies updated using the techniques described above.

The (re)computing the support to the hypothesis that the host or link in the quarantine is legit or malicious may comprise:—computing a similarity of the host or link in quarantine with another host or link.

As explained above, the support to the hypothesis may for example be formed by a probability that the hypothesis is true. The calculations may be performed using the attribute values of the host or link in quarantine, and may for example be performed by comparing, determining a measure of similarity of the attributes of the host or link in quarantine with the attributes of a known host or link. Furthermore, the attributes values of the host or link in quarantine may be held against the existing polices, and the outcome thereof may be used as evidence in the computation of the support to the hypotheses. For instance, if the host or link in quarantine has most (e.g. higher than 90%) of attribute values equal to a known host or link, then we increase the support to the legit hypothesis. Similarly, if the host or link has attribute values rarely or never seen (e.g., less than 1% of known host or link models have such values) then we increase the support to the malicious hypothesis.

As mentioned, the using the data traffic related to the host or link to extract new whitelist policies respectively the using the data traffic related to the host or link to extract new blacklist policies may comprise learning the whitelist policies respectively the blacklist policies using the above described learning techniques.

Hence, the learning of the attribute based policies may not only be performed at an initial stage, e.g. in a learning phase, but may be continued during operation, so as to provide that the intrusion detection system keeps learning to adapt to legitimate changes, new malicious activities etc.

The process of self-updating of attribute-based policy may be described as follows:

the process to maintain and analyze the information contained in the quarantine in order to extract new black/white list attribute-based policies from new emerging behavior. The algorithm works in the following way:

1. Let qi be a host or a link in the quarantine.
2. Anytime new data traffic related to qi is observed:
   add the data traffic to the evidence related to qi
   (re)compute the support to the hypothesis that the quarantine item qi is legit (hypothesis 0)
   (re)compute the support to the hypothesis that the quarantine item qi is malicious (hypothesis 1)
3. For each item in quarantine, the user can provide feedback that will directly impact the related value of hypothesis 0 or hypothesis 1.

4. When a trigger is fired (e.g., a certain period has passed or the user has provided feedback), for each item q in quarantine and for a given threshold $\tau$.
   (a) if hypothesis $0>\tau$, remove q from quarantine and add the network messages to the set of legit messages;
   (b) if hypothesis $1>\tau$, remove q from quarantine and add the network messages to the set of malicious messages;
5. Give the set of legit messages as input to the attribute-based policy learning algorithm to learn new whitelist policies;
6. Give the set of malicious messages as input to the attribute-based policy learning algorithm to learn new blacklist policies;
7. Update the current whitelist and blacklist policies.

Self-updating policies may provide to keep policies and consistency rules up-to-date. This is obtained by suspending the judgment of network events that do not explicitly violate existing policies or consistency rules until 'enough' information is available. In addition, the information collected during the 'suspended judgment', is continuously analyzed in order to verify whether, considered as a whole, such information does suggest the adherence to an acceptable or a not-acceptable pattern. Finally, when the time comes, the information collected is also aggregated and semantically interpreted for the presentation to the end user. In this way, rather than presenting the user with a detailed lists of events (e.g., 'New host 192.168.1.5', 'New communication of host 192.168.1.5 with host 192.168.1.4', 'New communication with protocol Modbus', . . . ), we can reason about the events and present a single meaningful message (e.g., 'New host that looks like a legit RTU has been identified'). The system allows the reduction of false positive caused by legitimate changes in the network behavior. This is achieved by automatically recognizing new emerging legitimate behavior and by automatically embedding it in new policies derived from the new information collected. By suspending judgment, collecting additional evidence to gain more support before making a decision and using semantic enrichment, we go beyond the general approach to anomaly detection. In fact, generally a single anomaly is considered bad and many anomalies are considered worse. On the contrary, in our case, many anomalies might be a good thing, suggesting that what we are observing is not bad, but just the emerging of new legit behavior.

The inventors aim at addressing the problem that static, 'defined once, valid forever' security policies are not able to deal with changes in dynamic environments. In addition, policies tend to become suboptimal with time, as the operational requirements change. A goal of this component is to keep policies and consistency rules in line with the current state of the system. This means that if new behavior that does not explicitly violates existing policies and constraints is observed and it is considered acceptable, then it needs to be embedded in the policy system.

Policies can be either defined by a human operator or generated by a learning algorithm. Both approaches suffer from the problem of producing incomplete policies set. In case of a human operator, incomplete policies are due to the fact that is difficult to list all acceptable or non-acceptable behavior (e.g., 0-days attacks). In case of a learning algorithm, incomplete policies are due to the fact that, during learning, it is possible that part of the acceptable activities does not emerge (e.g., not all the operation scenarios are executed) or that the system has gone under changes over time. This can eventually cause false positives, namely the misclassification of legit behavior as malicious.

Generally, every system, including computer networks, evolves over time and such change is known as concept drift. In some systems changes can occur faster (e.g., in IT networks) than in other (e.g., in OT networks). In an OT network, examples of concept drift include updates to the hardware (e.g., an old PLC is replaced) or to the underlining physical process. Most of the available solutions for network monitoring, independently from the model they use to perform detection, typically do not update such model or, in case they do, they require human intervention to define the new legit emerging behavior. However, to maintain the optimality of a detection model, it should be updated continuously. To this end, existing machine learning algorithms need to be revised in order to account for continuous update, change or pruning and, especially in network flows, for possible infinite stream of data. Our goal is to automatically identify new legit emerging behavior and automatically update existing policies and consistency rules. A first step towards this goal is the detection of malicious activities and the quarantining of unknown emerging behavior, as described below.

A quarantine Q is a list of records q in the form q: <ID, Target, Hyp0, Hyp1, E, M> where:

- ID is the identifier of the record q;
- Target $\in$ {Host, Link} is the host H or the link L that is in quarantine.
- Hyp0 $\in$ {0, 1} is the support (e.g., a probability) to the hypothesis that the host/link in quarantine is legit;
- Hyp1 $\in$ {0, 1} is the support (e.g., a probability) to the hypothesis that the host/link in quarantine is malicious;
- E: <e1, e2, . . . , en> is the list of events composing the evidence used to compute the support. Example of events can include: New Host; New Host Attribute Value (role=PLC); New Link; New Link Attribute Value (L.MessageType=reprogram); Alert; User feedback, . . .
- M: <m1, m2, . . . , mn> is the set of network messages related to the host/link in quarantine.

The detection and quarantining algorithm works as follows. Whenever a new network message is available, host and link attributes are extracted and if the network messages carries information about unknown hosts or links, they are added to the quarantine. Then, the algorithm proceeds to check for attribute inconsistencies and to match the network message with the attribute-based policies. In case a blacklist policy is matched, that means the network activity is related to a well-known attack, hence a 'blacklist alert' is raised. Otherwise, the activity is matched against the whitelist policies. In this case, the result of the matching can be threefold: 1) the activity matches a policy in the whitelist, hence we can go back to observe new network activities; 2) the activity does not match any policy, hence an alert is raised; or 3) the activity cannot be matched against the policies, e.g., because not all the attributes necessary to evaluate the policy are available. In the last two cases, the activity is new to the system, hence it is necessary to establish whether it is legitimate or not. To make such decision, a single network activity might not be sufficient, hence we adopt a quarantine approach that logs activities until enough information for emerging behavior is collected. The quarantine contains hosts and links that are in a limbo: the judgment of whether they are legit or not is suspended until there is not enough evidence to classify them.

This approach relies on the intuition that (too often) policies evaluation is made with a pessimistic approach, namely alerts are raised even when that is not necessary (i.e., not everything new is dangerous). Only in case evidence suggests the emerging of new (il)legitimate activities, it is used to infer new policies.

The detection and quarantining algorithm may work as follows.

1. Let P be the set of attribute-based policies where $p_i \epsilon P$ is referred to as blacklist if $p_i$.action==deny, while $p_j \epsilon P$ is referred to as whitelist if $p_j$.action==permit;
2. Let Q=<$q_1$, $q_2$, . . . , $q_n$, > be the quarantine with $q_1 \epsilon Q$ is in the form $q_i$=<$ID_i$, $Target_i$, $Hyp0_1$, $Hyp1_i$, $E_i$, $M_i$>
3. For every new network message m:
   - (a) extract the source host Hsrc, the destination host Hdst and the link L from m;
     - i. if Hsrc (or Hdst or L) is not in the database of known hosts/links, add it to the quarantine, namely create a quarantine item $q_{n+1}$=<(n+1), Hsrc, 0, 0, ø, m> and add $q_{n+1}$ to Q (do the same for Hdst or L);
   - (b) extract explicit and implicit attributes for Hsrc, Hdst and L;
   - (c) if extracted attributes are not compliant with consistency rules, then create an alert about a 'consistency violation';
     - i. if the alert involves hosts or links that are in quarantine, update the respective quarantine items by adding the alert as evidence;
     - ii. otherwise, add the alert to the list of alerts;
   - (d) else, update Hsrc, Hdst and L with the new attributes values;
     - i. if Hsrc, Hdst or L are in quarantine, update the respective quarantine items by adding the new attribute values as evidence;
   - (e) match m against each attribute-based policy $p_i \epsilon P$;
     - i. if m matches a blacklist policy, create an alert about a 'blacklist violation';
       - A. if the alert involves hosts or links that are in quarantine, update the respective quarantine items by adding the alert as evidence;
       - B. otherwise, add the alert to the list of alerts;
     - ii. else if m matches a whitelist policy, then go to analyze the next network message;
     - iii. else if m does not match any whitelist policy, then create an alert about a 'not white-listed violation';
       - A. if the alert involves hosts or links that are in quarantine, update the respective quarantine items by adding the alert as evidence;
       - B. otherwise, add the alert to the list of alerts;
     - iv. else if m match is undefined (namely no policy is matched e.g., because some of the attributes are not defined) then update the respective quarantine items by adding the candidate policies (e.g., policies that could in future be matched) as evidence;

Human operators can view the quarantine and eventually provide feedback or add missing information. This could help to collect more evidence about the (il)legitimacy of certain hosts/links. When the right time arrives, the elements in the quarantine can be analyzed by our self-updating algorithm to: extract new black- or white-list policies. Events that trigger the analysis of the quarantine include but are not limited to: i) a user's request, ii) the passing of a time period; iii) the fact that too many entries have been recently added to the quarantine; or iv) the observation of a specific event that, together with other events in the quarantine, permit to confirm or reject a hypothesis (e.g., the recognition of an acceptable or a not-acceptable pattern). For instance, let assume the system identifies a new host on the network. The new host might either be a new legit device added to the network (hypothesis Hyp0) or an intruder (hypothesis Hyp1). With a conservative detection approach, in this case one would immediately raise an alert. On the contrary, with our self-learning approach, we decide to quarantine the host and to wait for additional information before making any decision. For instance, if we observe activities that show the new host is similar to existing profiles and it does not violate any consistency rule nor blacklist policies, then the support to Hyp0 increases. On the other hand, if activities that show the host does not match any profile (e.g., it seems to belong to a certain role but it acts not in line with such a role) then the support to Hyp1 increases. One could then define a threshold for the support necessary to make a decision and to notify the end-user with a semantically valid message. Clearly, the system has to be tuned in such a way that, in case the pessimistic hypothesis Hyp1 is the correct one, the malicious host cannot stay in quarantine for long enough to make any damage. To this end, we rely on the fact that blacklist policies and consistency rules would immediately spot a condition of danger and raise an alert.

The self-updating algorithm may be defined as follows. The self-updating algorithm maintains and analyze the information contained in the quarantine in order to extract new black/white list policies from new emerging behavior. The algorithm works in the following way:

1. Let Q=<$q_1$, $q_2$, . . . , $q_n$, > be the quarantine with $q_1 \epsilon Q$ is in the form $q_i$=<$ID_i$, $Target_i$, $Hyp0_1$, $Hyp1_i$, $E_i$, $M_i$>
2. Anytime new evidence ei is added to the evidence Ei of a quarantine item qi:
   - (a) (re)compute the support to the hypothesis that the quarantine item qi is legit (Hyp0i) or malicious (Hyp1i) by accounting for the new evidence ei. In a possible embodiment, the support can be computed based on the evidence type. For instance, in case ei==New Host, we can compute the similarity of the new host with known host and increase Hyp0i if the similarity is high while increasing Hyp1i if the similarity is low. Similar approaches can be taken in case of New Attribute Value or New Link. In another embodiment, techniques such as First Order Logic, Bayesian Inference or Dempster-Shafer Evidence Theory can be used to compute the support.
3. For each item $q \epsilon Q$, the user can provide feedback that will directly impact the related value of Hyp0 and/or Hyp1.
4. When a trigger is fired (e.g., a certain period has passed or the user has provided feedback), for each item $q \epsilon Q$ and for a given threshold r:
   - (b) if q.Hyp0>τ then remove q from Q and add the network messages q.M to the set of legit messages Mlegit;
   - (c) if q.Hyp1→τ then remove q from Q and add the network messages q.M to the set of malicious messages Mmalicious;
5. Give Mlegit as input to the learning algorithm to learn new whitelist policies;
6. Give Mmalicious as input to the learning algorithm to learn new blacklist policies;
7. Update the current whitelist and blacklist policies.

This approach amongst others differs from existing solutions in the sense that while, typically, more anomalies means more 'alerts', hence more 'risk', in our case more anomalies can actually lead to less alerts.

This approach has the advantage of coping with changes in dynamic operational environments by continuously updating and refining policies.

Adopt a quarantine algorithm that suspend the judgment about a new host attributes or behavior until there is not enough evidence. In case evidence suggest the emerging of new legitimate activities, it is used to derive new policies.

The system allows to automatically capture changes in the monitored network behavior with reduced false alerts.

Changes are automatically embedded in new policies derived from the new information collected.

According to another aspect of the invention, there is provided an intrusion detection system configured to perform the method according to the invention. The intrusion detection system may comprise a data processing device such as a microprocessor, a memory in which program instructions are stored to make the microprocessor perform the method, a network connection for connecting to the data network in order to observe the data traffic. The memory may further store models, policies, alarm messages, etc. Optionally, a user interface may be provided, e.g. for alerting a user, etc.

The invention further provides a data communication network comprising the intrusion detection system according to the invention.

Still further, the invention provides an apparatus comprising the intrusion detection system according to the invention. Applications may for example include a host monitoring system, a host characterization and classification, a standard compliance checking, a policy compliance checking.

BRIEF DESCRIPTION OF THE DRAWINGS

Further features, effects and advantages will follow from the appended drawing, illustrating a non-limiting embodiment, wherein:

FIG. 5 illustrates examples of host and link attributes according to an embodiment of the invention;

FIG. 7 illustrates an example of inconsistency according to an embodiment of the invention;

FIG. 8 illustrates an example of a network traffic dataset according to an embodiment of the invention;

FIG. 10 illustrates an example of a data structure as applied for policy updating according to an embodiment of the invention.

FIG. 1 depicts a schematic view of a prior art intrusion detection system. The intrusion detection system is learned in a learning phase, and after the learning phase, the intrusion detection system is applied for intrusion detection. Whitelisting and/or blacklisting models may be learned.

DETAILED DESCRIPTION

Figure 1:
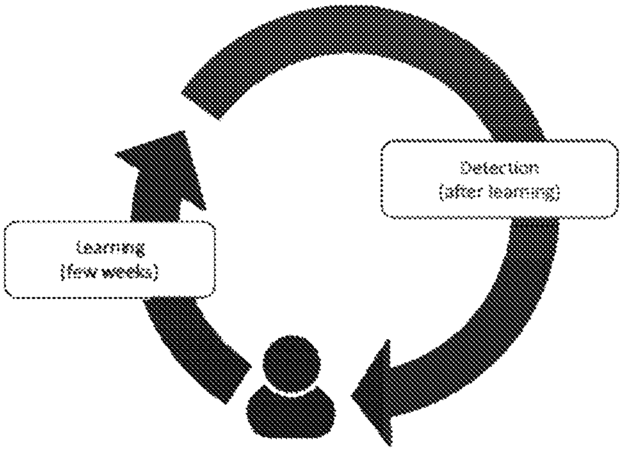
FIG. 1 illustrates an operating principle of a prior art intrusion detection system.
Figure 2:
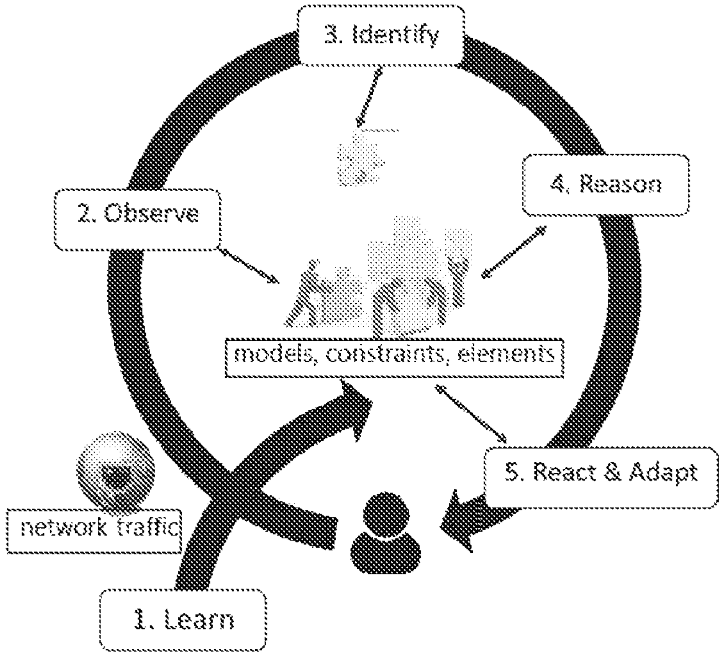
FIG. 2 illustrates an operating principle of an intrusion detection system according to an embodiment of the invention.

All in all, an intuition behind the present invention is that a whitelisting model cannot be learned once and remain static ever after anymore. In addition, relying on the operators for the manual update and maintaining of the model is unrealistic since operators often lack the time and the knowledge needed for the task. An idea underlying the present invention is to create a NIDS that automatically updates the model as new traffic is observed. A key challenge for the system is the capability of distinguishing what changes are legitimate (and can be added to the model) and what changes are not (and therefore should still generate alerts). The solution as proposed may form a radical change to the general approach to whitelisting NIDS by substituting the two-phases (learn/detect) approach with a continuous process that is able to deal with legitimate changes in the monitored traffic. The approach as proposed may include the following phases, as schematically depicted in FIG. 2:

1. learn: monitor the network for a short period of time and use the data collected to create initial models, policies and constraints;
2. observe: passively collect data from the network;
3. identify: use new available information to improve existing elements characterization or to create an initial characterization of new elements;
4. reason: verify if new evidence is in line with existing models and constraints and if it does suggest the emerging of new (legitimate) patterns;
5. react: if a mismatch with models and constraints is found generate an alert while in case there is enough evidence of (legitimate) emerging patterns update the models.

To implement this model in a successful way, semantic enrichment is made use of. With semantic enrichment, a NIDS is not only capable of communicating punctual facts about network activities (e.g., 'IP 192.168.1.4 sends Step7 command 240 to IP 192.168.1.5') but also of interpreting such facts to make them more understandable and increase their information gain (e.g., 'A PLC is sending a reprogramming message to another PLC'). The semantic enrichment reduces the distance between technology and human operators: if operators get more valuable information from the automatic system (e.g., more meaningful alerts) they are also more inclined to provide feedback to tune the models that in turn improve the overall system.

Overview

Figure 4:
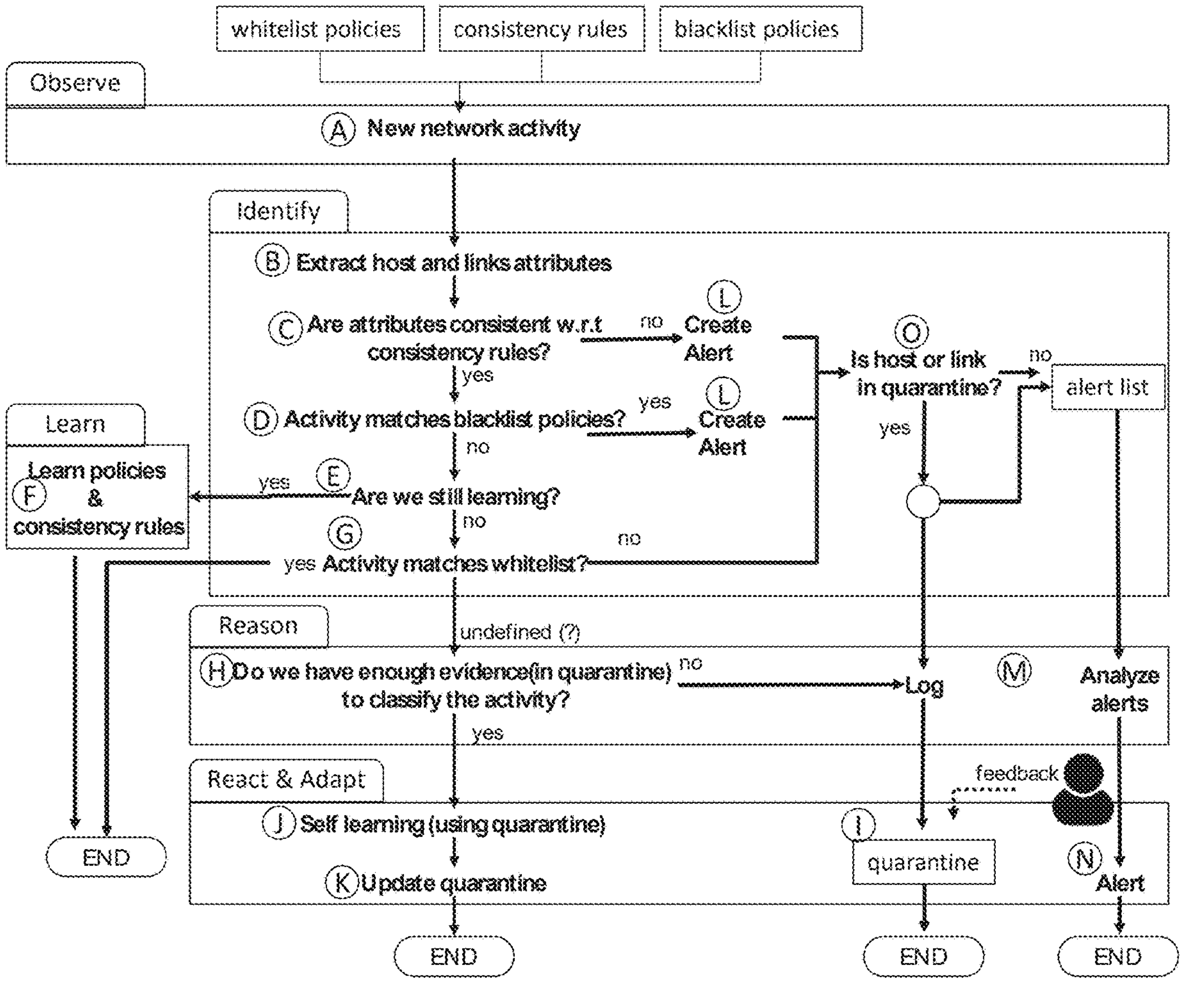
FIG. 4 illustrates an overview of an intrusion detection according to an embodiment of the invention.

FIG. 4 depicts an overview of the method as described in the present document. An initial set of whitelist and blacklist policies, together with consistency rules, is given as input to the system as soon as the network monitoring starts. Note that the whitelist and blacklist policy set, together with the consistency rule set could be initially empty. For every new network activity (A), the system extract hosts' and links' attributes (B). It is important to distinguish between hosts' and links' attributes: while hosts' attributes refer to characteristics of a host, links' attributes refers to the communication taking place between hosts. Once attributes are available, a consistency check (by using the available consistency rules) is performed (C). In case the current attributes do not comply with the consistency rules, an alert is stored in the alert list (L), otherwise the process continues. At this point the network action is matched against the blacklist (D): if a match occurs an alert is generated (L), otherwise we can distinguish two cases: if the system is still in learning mode (E) then the network activity is given in input to the learning module to updated the whitelist policies and the consistency rules; on the other hand, in case the learning phase is over, the network activity is matched against the whitelist policies (G). In case a match occurs at this point, it means the network activity has been already seen in the past (known host/behavior), otherwise we are in the situation where a unknown hosts or behavior is emerging. Typical Network Intrusion Detection Systems (NIDS) at this point would raise an alert. On the contrary, we decide to use a quarantine system that logs network activities (I) until there is not enough evidence to judge the activity legitimate or illegitimate (H). Note that, we also log alerts in the quarantine (O) in case the alert is related to hosts or links that are in the quarantine. In case enough information to make a decision is available, the system will use the events in quarantine for self-updating, namely dynamic extraction of new white- or black-list policies (J). The creation of new policies also produces an event (K) that can be added to the quarantine as additional evidence. Finally, the alert list is analyzed in order to aggregate, correlate and interpret (M) its content and to generate semantic-enriched and context-aware alerts addressed to the end-users (N). The end-users can visualize the alerts and the quarantine items and they can also provide feedback to the quarantine such as flag hosts and links as legitimate or malicious.

In the following, we explain in details of the main components that help to implement the system described above, namely Attributes extraction, Inconsistency detection, Attribute-based policies, Learning of attribute-based policies and Self-updating policies.

Attribute Extraction

Figure 3:
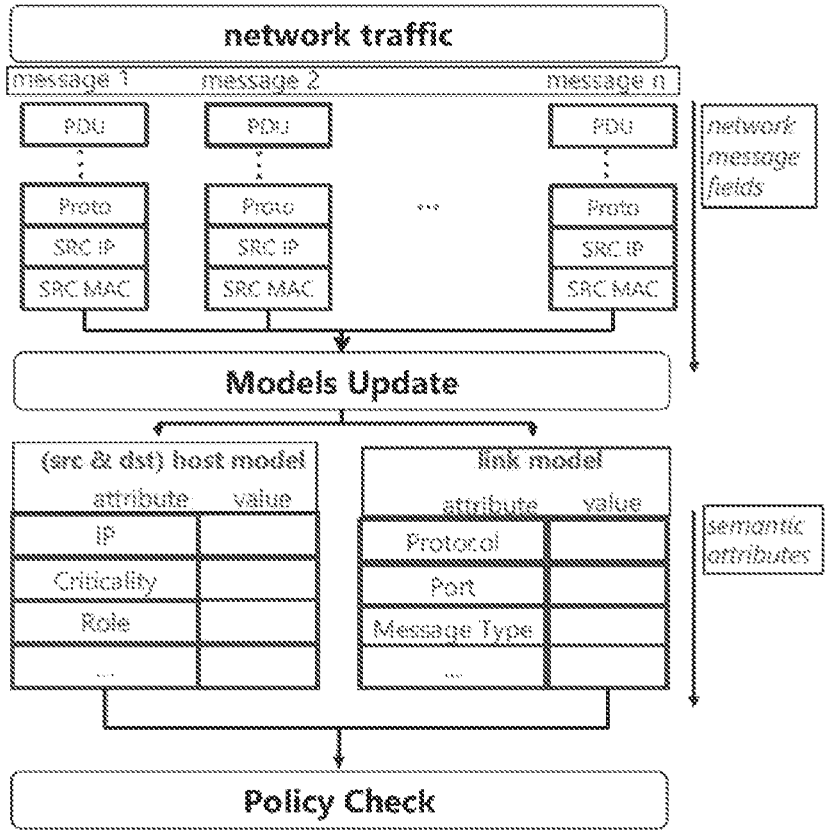
FIG. 3 illustrates a possible attribute extraction according to an embodiment of the invention.

FIG. 3 shows a possible embodiment for the extraction of hosts and links attributes by capturing network traffic. The first step is to extract explicit attributes. Once explicit attributes are available, we can proceed to derive the implicit attributes, for which there is no trivial map with message fields. Each implicit attribute can be derived by applying either heuristics or classifiers. Typically, the results obtained by heuristics have priority over classifiers. An example of heuristic used to infer the attribute Role is as follows: "If a conversation using the DNS protocol is observed, then the target host of such link has role DNS server". Clearly, several such heuristics can be put in place. In addition, heuristics can be global or local to a specific deployment (e.g., heuristics that are true only in a given sector). On the other hand, a classifier is a model that given a set of features as input is able to associate a value (or class) to an attribute as output. Classifiers are typically generated by applying machine learning algorithms to labeled datasets, namely datasets where the association between features and class is known. Later, these classifiers can be used to infer the class on un-labeled data. Generally, classifiers associate a confidence level to their guessing: to keep our attribute extraction component highly reliable, we only resolve the attribute if the class guessed by the classifier has a high level of confidence (e.g., more than 90%). Note that, it is possible that certain implicit attributes can stay unresolved for a certain time, e.g., until enough information to assess their value is available (see the vendor attribute in the first row in FIG. 5).

Example of Attribute Modelling

Figure 6:
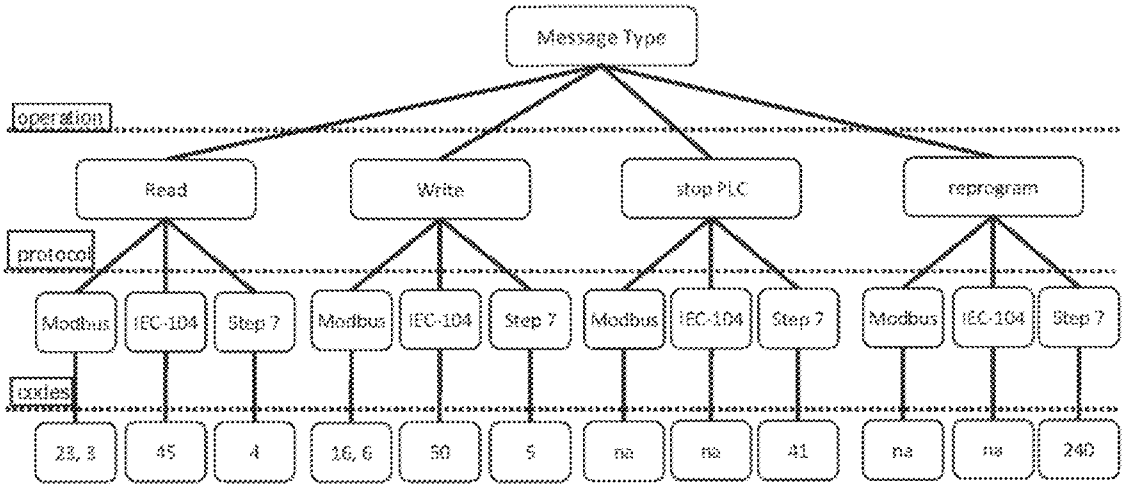
FIG. 6 illustrates a model for a link attribute according to an embodiment of the invention.

FIG. 6 shows how the implicit link attribute message type can be modeled. The attribute message type expresses the semantic meaning that a specific network message can have in a certain domain. For instance, if host A sends a Modbus message to host B with function code 23, it means that host A is reading a data value from host B. The reading operation, as shown in figure, can be encoded differently for different protocols: e.g., in IEC-104 a read is encoded with the number 45 and in STEP 7 with the number 4. By applying reasoning and semantic labeling, one can enrich the raw traffic coming from the network. This enrichment can then be used to express policies that are generic (not specific to a given protocol) and simpler to understand. For instance, one could express the generic policy "Hosts with role Terminal do not reprogram a PLC" and such policy can be monitored without the policy maker knowing how the reprogramming operation is actually encoded at the network level.

Example 1

Let assume we have the following host-related attributes $A_H$, link-related attributes $A_L$, context-related attributes $A_C$ where the symbol ? means the attribute value is unknown, and a network message $m_1$ where:

s=<ip=?, mac=?, os=?, role=?>

$A_L$=<proto=?, srcPort=?, dstPort=?, messageType=?, linkType=?>

$A_C$=<location=?, netwrokType=?, time=? msgFrequency=?>

$m_1$=<protoId=Modbus, srclp=10.1.1.1, dstlp=10.1.1.2, srcPort=22; dstPort=44; functionCode=16> where the fields are in the order: the identifier of the protocol used (e.g., Modbus, HTTP, IOEC104), the IP address and the port for the sender and the destination, and the function code of the message.

Given the message $m_1$, we can extract the following host and link information:

$H_1$=<id=1, $A_H$=<ip=10.1.1.1, mac=?, os=?, role=?>>

$H_2$=<id=2, $A_H$=<ip=10.1.1.2, mac=?, os=?, role=?>>

$L_1$=<id=1, $H_{src}$=$H_1$, $H_{dst}$=$H_2$, $A_L$=<proto=Modbus, srcPort=22, dstPort=44, messageType=?, linkType=?>>

In this example, we can see that the link-related attribute L.proto is an explicit attribute since there is a direct mapping between its value (Modbus) and the field protoId of m1. On the other hand, the host-related attribute H.role is an example of implicit attribute since to derive its value one should look at multiple messages and multiple message fields. In fact, given a single message, this attribute stays undefined. For instance, to be able to say that the role of a host is server or client, one has to look at the functionCode and the protoId fields of different messages and at the number of messages with a certain functionCode (e.g., server typically are the destination of a high number of messages on certain ports with certain message codes). Under these conditions, an example of attribute-policy P is as follows:

```
<if
  L.Hsrc.role == Engineering Workstation AND
  L.Hdst.role == PLC AND
  L.messageType == reprogram AND
  C.networkType == industrial
then
  allow,
  send email = name@domain.com, set priority = high>
```

Inconsistency Detection

FIG. 7 shows some example of inconsistency detection. The upper part of the figure shows the 'normal' situation of an example network composed of 4 hosts: 2 DCSs (Distributed Control Systems) and two PLCs (Programmable Logic Controllers). The table shows examples of consistency rules. Specifically, rule number 1 says that if a host has role equal to PLC then its protocols can only be Modbus, while rule number 2 says that if a host has role that includes the value PLC, then it can only have Master and RTU as additional role (recall that a host can have multiple roles). Finally rule number 3 says that if a host has OS equal to Windows then its vendor can only be Dell. Under these conditions, in case there is evidence that a certain device (e.g., host F in figure) having role equals to PLC is behaving as a host with role DNS server, there is a violation of consistency rule number 2. This might suggest that a PLC is corrupted and malicious code is generating the anomalous change of role. Likewise, if the protocols associated to a host contain values Domain Name System (DNS) and File Transfer Protocol (FTP) client while the role for the same host is PLC, there is a violation of consistency rule number 1, also suggesting a corruption of the PLC. On the other hand, in case the vendor of a host is detected to be HP, then rule number 3 is violated. Generally, consistency violations might either indicate that there is a legit change in the system (e.g., the management decided to change its hardware provider) or that a host is compromised hence the consistency rule violation is a signal that something is wrong. Understanding which of the two situations is true is a task for the self-updating policies component.

Learning of Attribute Based Policies

FIG. 8 shows an example of how legitimate network messages can be structured after the attributes extraction had took place. As we can see, every row represents a network activity and the associated at tributes (or features). To this data structure, machine learning and data mining techniques can be applied to extract attribute-based policies. For instance, one could apply association rules learning, a rule-based machine learning method for discovering interesting relations between elements in large datasets. Association rules are if condition then action statements (as our policies) that help uncover relationships between seemingly unrelated data.

Figure 9:
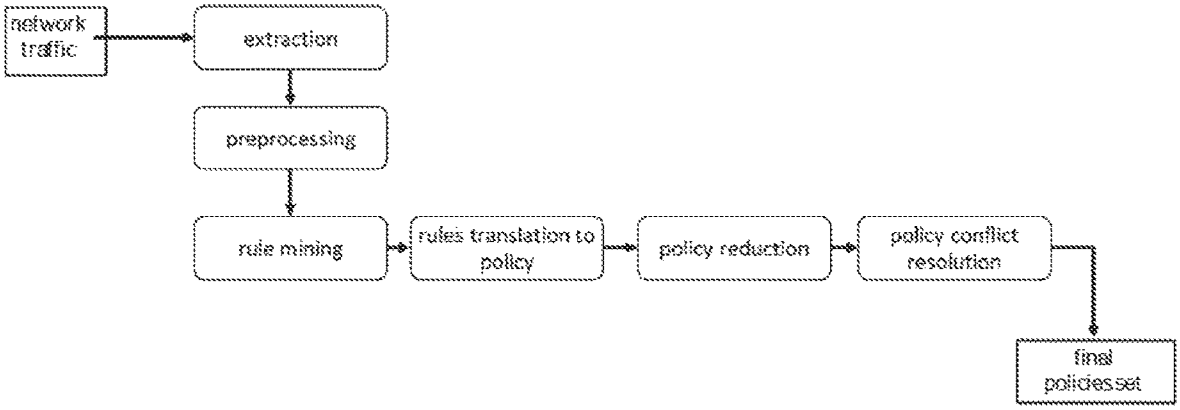
FIG. 9 illustrates a process of policy learning according to an embodiment of the invention.

However, association rules and frequent items set extraction are approaches that can aid our policies generation but do not cover the entire process as shown in FIG. 9. In fact, after an association rules algorithm has been applied to network data, the information extracted from the data needs to be translated in policies. In addition, since association rules tend to generate a high number of rules, an algorithm for policy reduction and conflict resolution needs to be put in place as well.

TABLE 1

Association Rules Example

| ID | Confidence (%) | Antecedent | Consequent | Support (#) |
|---|---|---|---|---|
| 1 | 99.9 | L.Hsrc.Role = SCADA & L.Hdst.OS = Proprietary | L.MessageType = reprogram | 1500 |
| 2 | 100 | L.Hsrc.Role = SCADA | L.MessageType = reprogram | 1600 |
| 3 | 50 | L.Proto = SMB | L.DstPort = 139 | 850 |
| 4 | 0.7 | L.Proto = HTTP | L.DstPort = 815 | 2 |

Quarantine

FIG. 10 shows an example of how the quarantine could look like.

The detection and quarantining algorithm works as follows. Whenever a new network message is available, host and link attributes are extracted and if the network messages carries information about unknown hosts or links, they are added to the quarantine. Then, the algorithm proceeds to check for attribute inconsistencies and to match the network message with the attribute-based policies. In case a blacklist policy is matched, that means the network activity is related to a well-known attack, hence a 'blacklist alert' is raised. Otherwise, the activity is matched against the whitelist policies. In this case, the result of the matching can be threefold:

1) the activity matches a policy in the whitelist, hence we can go back to observe new network activities; 2) the activity does not match any policy, hence an alert is raised; or 3) the activity cannot be matched against the policies, e.g., because not all the attributes necessary to evaluate the policy are available. In the last two cases, the activity is new to the system, hence it is necessary to establish whether it is legitimate or not. To make such decision, a single network activity might not be sufficient, hence we adopt a quarantine approach that logs activities until enough information for emerging behavior is collected. The quarantine contains hosts and links that are in a limbo: the judgment of whether they are legit or not is suspended until there is not enough evidence to classify them.

This approach relies on the intuition that (too often) policies evaluation is made with a pessimistic approach, namely alerts are raised even when that is not necessary (i.e., not everything new is dangerous). Only in case evidence suggests the emerging of new (il)legitimate activities, it is used to infer new policies.

Self-Updating Policies

Let consider the quarantine example in FIG. 10. The first row contains a host (id=1) and the relative evidence to support the fact that it is legit (Hyp0) or malicious (Hyp1). Specifically, the host was first unknown to the system with no attributes associated yet (first line in column evidence). Additional network activities added evidence about its role equal to PLC (line 2 of column evidence) and later also about its vendor being equal to ABB (line 3 of column evidence). The quarantine also contains a link (quarantine id 2) going from host with id=2 to host with id=1. The evidence says that the link goes from a host id=2 with role Terminal to the host id=1 with role PLC. In addition, a reprogramming messageType is observed. Every time new evidence for a host or a link in quarantine is collected, the support to Hyp0 and Hyp1 is updated. Let assume an attribute-based policy says that hosts with role Terminal cannot reprogram hosts with role PLCs. This means that this policy can only be matched (and hence an alert raised) when evidence that the attribute role for the host id=1 is PLC is collected. Hence, the quarantine helps to detect cases where past activities have violated policies currently in places.

In addition, at any time, the user is allowed to provide feedback about the quarantine. For instance, the user could say that host with id=1 is legit. In this case, the self-learning module needs to account for all the activities performed by host with id=1 while in quarantine, as input for the extraction of possibly new white-listing policies.

Possible definitions as may be applied to define various terms applied in the present patent application are provided below.

Definition 1 (Attributes A)

A sequence of attributes A is defined as A: $<a_1=v_{a1}, a_2=v_{a2}, \ldots, a_n=v_{an}, >$ where $v_{ai} \epsilon V_i$ with $i \epsilon [1, n]$ is the value taken by attribute $a_i$ in the co-domain $V_i$.

Definition 2 (Host H and Host Attributes AH)

A network host H, is defined as H=<id, AH> where id is an unique identifier for the host, and $A_H$: $<ah_1=v_{h1}, a_{h2}=v_{h2}, \ldots, a_{hn}=v_{hn}, >$ is a sequence of host-related attributes. Examples of host-related attributes include the IP address, the MAC address, the operative system, the role, etc. We write Hj.ahi to refer to a specific attribute of a specific host, e.g., Hj.role to refer to the attribute role of the host Hj.

Definition 3 (Link L and Link Attributes AL)

A network link is a direct communication between a source and a destination hosts. We define a link L=<id, Hsrc, Hdst, AL> where id is an unique identifier for the link, Hsrc is the host source of the link, Hdst is the host destination of the link and $A_L$: $<al_1=v_{l1}, al_2=v_{l2}, \ldots, al_m=v_{lm}, >$ is the sequence of link-related attributes. Example of link-related attributes include the protocol, the src port, the dst port, the message type, the link type, etc. We write Lj.ali to refer to a specific attribute of a specific link, e.g., Lj.proto to indicate the attribute proto of the link Lj. We also write Lj.Hsrc.ahi to refer to a specific attribute of the source (respectively the destination) host of the link, e.g., L.Hsrc.ip to refer to the IP address of the source host of the link (respectively L.Hdst.ahi to refer to an attribute of the host destination, e.g., L.Hdst.ip).

Definition 4 (Context Attributes AC)

A context C is a set of circumstances surrounding network activities, and it can be represented by a set of attributes related to the network or the system. A context is denoted as $A_C$: $<ac_1=v_{c1}, ac_2=v_{c2}, \ldots, ac_n=v_{ck}, >$. Examples of context-related attributes include the time, the geo-graphical location, the type of monitored network (e.g., utility, manufacturing, and automation), the number of similar messages over a certain period, etc.

Definition 5 (Network Message m)

A communication protocol is a system of rules that allows two or more hosts to exchange information via the usage of elements with a well-defined structure. The structure of these elements changes greatly from one protocol to another and their terminology changes too: they can be referred to as packets, frames or messages. Independently from the protocol, we use the term message to refer to the basic elements of network communications. Given a sequence of fields $<f_1, f_2, \ldots f_z, >$, we define a field value $v_{fj} \epsilon V_j$ with $j \epsilon [1, z]$ as the value taken by field f in the co-domain $V_j$ and we define a message m as a sequence of field values $m=<f_1=v_{f1}, f_2=V_{f2}, \ldots, f_z=v_{fz}>$.

Definition 6 (Explicit Attributes)

Given a set of host- and link-related attributes $A=A_H \cap A_L=<a_1=v_{a1}, a_2=v_{a2}, \ldots, a_n=v_{an}>$ where $a_1 \epsilon A$ has value $v_{a1} \epsilon V_1$ with $i \epsilon [1, n]$ and a sequence of messages $M=<m_1, m_2, \ldots, m_w>$ where $m_j \epsilon M$ is in the form $m_j=f_{1j}=v_{f1j}, f_{2j}=v_{f2j}, v_{f2j}=v_{f2j}, \ldots, f_{zj}=v_{fzj}>$ with $j \epsilon [1, w]$, we say that the attribute $a_1$ is explicit if its value is equal to a single field value of any of the messages in M, namely $v_{ai}=v_{fkj}$ with i index of the attribute, k index of the message field, and j index of the message. We will refer to an explicit attribute as $a_e$.

Definition 7 (Implicit (or Semantic) Attributes)

Given a set of host- and link-related attributes $A=A_H \cap A_L=<a_1=v_{a1}, a_2=v_{a2}, \ldots, a_n=v_{an}>$ where $a_1 \epsilon A$ has value $v_{a1} \epsilon V_1$ with $i \epsilon [1, n]$ and a sequence of messages $M=<m_1, m_2, \ldots, m_w>$ where $m_j \epsilon M$ is in the form $m_j=<f_{1j}=v_{f1j}, f_{2j}=v_{f2j}, \ldots, f_{zj}=v_{fzj}>$ with $j \epsilon [1, w]$, we say that: the attribute $a_1$ is implicit or semantic if its value is a function of multiple field values and context-related attributes $A_C$ over (possibly) multiple messages, namely if it exists a function g( ) such that $g(M')=v_{ai}$ where $M' \subset M \times A_C$ We will refer to an implicit attribute as $a_i$.

Definition 8 (Attribute Based Policy)

The Attribute-based policy P may be defined as follows:

Given a set of host-, link- and context-related attributes $A=A_H \cap A_L \cap A_C=<a_1=v_{a1}, a_2=v_{a2}, \ldots, a_n=v_{an}>$ where $a_1 \epsilon A$ has value $v_{a1} \epsilon V_1$ with $i \epsilon [1, n]$, we define an attribute-based policy as:

P: if <ATTRIBUTE OP VALUE [{LOGICOP ATTRIBUTE OP VALUE}]> then ACTION [{, OBLIGATION}]> where:

ATTRIBUTE can be any host-, link- or context-based attribute ai P A;

OP can be any comparison operation (e.g., P t→, →, →, ↕, X, P equal ✉, etc.);

VALUE is any value vai∈Vi the attribute ai can take;

LOGICOP is any logical operator (e.g., t{, ), ✣ ✉)

ACTION defines what has to be done in case of a positive match of the policy (e.g., deny or permit)

OBLIGATION defines additional actions to be taken in case of a match (e.g., send email=name@domain.com, set priority=high, set criticality=medium).

Definition 9 (Quarantine)

A quarantine Q is a list of records q in the form q: <ID, Target, Hyp0, Hyp1, E, M> where:

ID is the identifier of the record q;

Target∈{Host, Link} is the host H or the link L that is in quarantine.

Hyp0∈{0, 1} is the support (e.g., a probability) to the hypothesis that the host/link in quarantine is legit;

Hyp1∈{0, 1} is the support (e.g., a probability) to the hypothesis that the host/link in quarantine is malicious;

E: <e1, e2, . . . , en> is the list of events composing the evidence used to compute the support. Example of events can include: New Host; New Host Attribute Value (role=PLC); New Link; New Link Attribute Value (L.MessageType=reprogram); Alert; User feedback, . . .

M: <m1, m2, . . . , mn> is the set of network messages related to the host/link in quarantine.

Definition 10 (Detection and Quarantining Algorithm)

The detection and quarantining algorithm may work as follows.

1. Let P be the set of attribute-based policies where $p_i \epsilon P$ is referred to as blacklist if $p_i$.action==deny, while $p_j \epsilon P$ is referred to as whitelist if $p_j$.action==permit;

2. Let $Q=<q_1, q_2, \ldots, q_n, >$ be the quarantine with $q_1 \in Q$ is in the form $q_i=<ID_i, Target_i, Hyp0_1, Hyp1_i, E_i, M_i>$
3. For every new network message m:
(f) extract the source host Hsrc, the destination host Hdst and the link L from m;
i. if Hsrc (or Hdst or L) is not in the database of known hosts/links, add it to the quarantine, namely create a quarantine item $q_{n+1}=<(n+1)$, Hsrc, 0,0, ø, m> and add $q_{n+1}$ to Q (do the same for Hdst or L);
(g) extract explicit and implicit attributes for Hsrc, Hdst and L;
(h) if extracted attributes are not compliant with consistency rules, then create an alert about a 'consistency violation';
i. if the alert involves hosts or links that are in quarantine, update the respective quarantine items by adding the alert as evidence;
ii. otherwise, add the alert to the list of alerts;
(i) else, update Hsrc, Hdst and L with the new attributes values;
i. if Hsrc, Hdst or L are in quarantine, update the respective quarantine items by adding the new attribute values as evidence;
(j) match m against each attribute-based policy $p_i \in P$;
i. if m matches a blacklist policy, create an alert about a 'blacklist violation';
A. if the alert involves hosts or links that are in quarantine, update the respective quarantine items by adding the alert as evidence;
B. otherwise, add the alert to the list of alerts;
ii. else if m matches a whitelist policy, then go to analyze the next network message;
iii. else if m does not matches any whitelist policy, then create an alert about a 'not white-listed violation';
A. if the alert involves hosts or links that are in quarantine, update the respective quarantine items by adding the alert as evidence;
B. otherwise, add the alert to the list of alerts;
iv. else if m match is undefined (namely no policy is matched e.g., because some of the attributes are not defined) then update the respective quarantine items by adding the candidate policies (e.g., policies that could in future be matched) as evidence;

Definition 11 (Self-Updating Algorithm)

The self-updating algorithm maintains and analyze the information contained in the quarantine in order to extract new black/white list policies from new emerging behavior. The algorithm works in the following way:

1. Let $Q=<q_1, q_2, \ldots, q_n, >$ be the quarantine with $q_i \in Q$ is in the form $q_i=<ID_i, Target_i, Hyp0_1, Hyp_1 1, E_i, M_i>$
2. Anytime new evidence ei is added to the evidence Ei of a quarantine item qi:
(d) (re)compute the support to the hypothesis that the the quarantine item qi is legit (Hyp0i) or malicious (Hyp1i) by accounting for the new evidence ei. In a possible embodiment, the support can be computed based on the evidence type. For instance, in case ei==New Host, we can compute the similarity of the new host with known host and increase Hyp0i if the similarity is high while increasing Hyp1i if the similarity is low. Similar approaches can be taken in case of New Attribute Value or New Link. In another embodiment, techniques such as First Order Logic, Bayesian Inference or Dempster-Shafer Evidence Theory can be used to compute the support.
3. For each item $q \in Q$, the user can provide feedback that will directly impact the related value of Hyp0 and/or Hyp1.
4. When a trigger is fired (e.g., a certain period has passed or the user has provided feedback), for each item $q \in Q$ and for a given threshold $\tau$:
a. if q.Hyp0>τ then remove q from Q and add the network messages q.M to the set of legit messages Mlegit;
b. if q.Hyp1→τ then remove q from Q and add the network messages q.M to the set of malicious messages Mmalicious;
5. Give Mlegit as input to the learning algorithm to learn new whitelist policies;
6. Give Mmalicious as input to the learning algorithm to learn new blacklist policies;
7. Update the current whitelist and blacklist policies.

The following numbered clauses 101-146 form part of the description:

101. A method of detecting anomalous behaviour in data traffic on a data communication network, a first host and a second host being connected to the data communication network, the data traffic on the data communication network providing a link (forming a network communication) between the first host and the second host, the method comprising:
a) parsing the data traffic to extract protocol field values of a protocol message of the data traffic;
b) deriving, from the extracted protocol field values, attribute values of attributes of one of the first host, the second host, and the link;
c) selecting from a set of models, a model relating to the one of the first host, the second host, and the link, wherein the selected model comprises a plurality of attributes to describe the one of the first host, the second host, and the link;
d) updating the selected model with the derived attribute values, if the derived attribute values are not featured (e.g. upon selection) in the selected model relating to the one of the first host, the second host and the link;
e) assessing if the updated, selected model complies with a set of attribute based policies, each attribute based policy of the set of attribute based policies defining a security constraint of the data communication network based on at least one of the attributes of the first host, the second host, or the link; and
f) generating an alert signal in case the attribute based policies indicate that the updated selected model violates at least one of the attribute based policies, the method further comprising learning an attribute based policy from the data traffic, the learning comprising, in a learning phase:
monitoring the data traffic,
deriving host attributes and link attributes from the monitored data traffic,
transforming the data traffic into a dataset of attribute-based transactions,
generating rules by taking into account a frequency of item sets of the host attribute values and link attribute values in the dataset, each one of the rules comprising an antecedent defining a condition and a consequent defining an action,
determining for each rule a level of confidence that specifies how often the rule appears to be true, and a level of support that specifies how often the item set underlying the rule appears in the dataset, selecting rules based on the level of support and the level of confidence, translating the rules into the attribute based policy by defining the attribute-based policy condition by joining the antecedent and the consequent of the selected rules, and defining the attribute-based policy action based on the level of support and/or the level of confidence.

102. The method according to clause 101, wherein the selecting rules based on the level of support and the level of confidence comprises:

selecting, for whitelist policies, rules having the level of confidence above a predetermined positive level of confidence and having a level of support above a predetermined level of support.

103. The method according to clause 101 or 102, wherein the selecting rules based on the level of support and the level of confidence comprises:

selecting, for blacklist policies, rules having the level of confidence below a predetermined negative level of confidence and having a level of support above a predetermined level of support.

104. The method according to any of the preceding clauses 101-103, wherein the generating rules from the host attributes and the link attributes comprises applying association rules to the host attributes and the link attributes.

105. The method according to any of the preceding clauses 101-104, wherein the generating rules from the host attributes and the link attributes comprises applying frequent items set extraction to the host attributes and the link attributes.

106. The method according to any of the preceding clauses 101-105, wherein translating the rules into the attribute based policy further comprises:

reducing the number of policies by removing redundant policies, a policy being redundant if its condition includes the whole condition of another policy.

in case of conflict where two policies share the same condition while the two policies comprise different actions, remove the policy that has less support and confidence.

107. The method according to any of the preceding clauses 101-106, wherein at least one of the attributes is a semantic attribute, the semantic attribute expressing a semantic meaning for the one of the first host, the second host, and the link.

108. The method according to to any of the preceding clauses 101-107, wherein the at least one semantic attribute value is derived from a combination of protocol field values obtained from at least two protocol messages transmitted over the data communication network at different points in time.

109. The method according to to any of the preceding clauses 101-108, wherein the set of models comprises a model for the first host, a model for the second host and a model for the link, wherein each of the models comprises at least one semantic attribute.

110. The method according to any of the preceding clauses 101-110, wherein the policies each define an outcome in case a condition is met, the condition being defined in terms of a respective at least one of the attributes having a defined attribute value, the outcome of the attribute based policies indicating if the selected model is allowable or not allowable.

111. The method according to any of the preceding clauses 101-110, wherein the condition of each policy comprises at least one semantic attribute value.

112. The method according to any of the preceding clauses 101-111, wherein b) comprises applying rules to the protocol field values, the rules assigning attribute values to attributes based on the protocol field values.

113. The method according to any of the preceding clauses 101-112, wherein b) comprises direct mapping protocol fields on attribute values.

114. The method according to any of the preceding clauses 101-113, wherein b) comprises applying a heuristic to the data traffic and deriving the semantic attribute value using the heuristic.

115. The method according to any of the preceding clauses 101-114, wherein b) comprises applying a classifier to the data traffic and deriving the semantic attribute value using the classifier.

116. The method according to clause 115, further comprising determining a level of confidence of the classifier and wherein the attribute value is only derived from the classifier when the level of confidence is above a predetermined confidence level.

117. The method according to any of clauses 114-116, wherein the attribute value obtained using the heuristic has priority over the attribute value obtained using the classifier.

118. The method according to any of the preceding clauses 101-117, wherein no stimulus is injected into the data communication network.

119. The method according to any of the preceding clauses 101-118, wherein steps b), c), d) and e) are performed for the first host, for the second host and for the link, the set of models comprising a model relating to the first host, a model relating to the second host and a model relating to the link, the attribute based policies of the set of attribute based policies defining conditions in terms of the attributes of the first host, the attributes of the second host and the attributes of the link.

120. The method according to any of the preceding clauses 101-119, wherein the set of attribute based policies comprises whitelist policies, the outcome of the whitelist policies indicating if the selected model is allowable.

121. The method according to any of the preceding clauses 101-120, wherein the set of attribute based policies comprises blacklist policies, the outcome of the blacklist policies indicating if the selected model is not allowable.

122. The method according to any of the preceding clauses 101-121, further comprising providing a consistency rule, the consistency rule defining consistent combinations of at least two attribute values of attributes of the model relating to the one of the first host, the second host, and the link, comprising verifying, on the basis of the values of the attributes derived from the monitored data traffic, if the monitored data traffic complies to the consistency rule, storing the data traffic relating to the one of the first host, the second host and the link in a quarantine in case the data traffic relating to the one of the first host, the second host and the link does not comply to the consistency rule.

123. The method according to clause 122, wherein the verifying, on the basis of the values of the attributes derived from the monitored data traffic, if the monitored data traffic complies to the consistency rule, is performed before step e).

124. The method according to clause 122 or 123, wherein the consistency rule includes at least one of a time of occurrence of the data traffic and a location of occurrence of the data traffic.

125. The method according to any of clauses 122-124 wherein the consistency rule relating to the first host further comprises an attribute of another host, preferably an attribute of the second host.

126. The method according to any of clauses 122-125, wherein a group of hosts is defined, wherein the method comprises determining if the host to which the attributes relate, is comprised in the group, and applying the consistency rule in case the host to which the attributes relate, is comprised in the group.

127. The method according to any of clauses 122-126, wherein the consistency rules are learned using machine learning, preferably using association rules.

128. The method according to any of the preceding clauses 101-127, wherein the attribute based policy further expresses at least one of a time of performing an action, and a link via which the action is performed.

129. The method according to any of the preceding clauses 101-128, wherein the set of attribute based policies comprises the whitelist policies, the outcome of the whitelist policies indicating if the selected model is allowable, and wherein, in case the model relating to the first host, the second host or the link cannot be matched to any of the whitelist policies, the data communication relating to the respective one of the first host, the second host or link is listed in a quarantine.

130. The method according to any of the preceding clauses 101-129, wherein, in case the protocol message carries information about a host or link for which no model is available, the respective host or link is listed in a quarantine.

131. The method according to clause 130, further comprising:

deriving attribute values relating to the host or link listed in the quarantine.

132. The method according to clause 131, further comprising:

calculating, from the attribute values relating to the host or link listed in the quarantine, a support to a hypothesis that the host or link listed in the quarantine is legit, and calculating, from the attribute values relating to the host or link listed in the quarantine, a support to a hypothesis that the host or link listed in the quarantine is malicious, and, optionally, updating the set of attribute based policies in case the support to the hypothesis that the host or link listed in the quarantine is legit or the support to the hypothesis that the host or link listed in the quarantine is malicious exceeds a predetermined threshold.

133. The method according to clause 132, wherein the calculating the supports to the hypotheses is repeated when the attribute values relating to the host or link listed in the quarantine have been updated.

134. The method according to any of clauses 30-133, wherein the quarantine comprises, for the hosts and/or links listed in the quarantine:

an identification of the host or link, a list of known attribute values of the host or link, a support to a hypothesis that the host or link is legit, a support to a hypothesis that the host or link is malicious, an identification of data traffic used to determine the support to the hypotheses.

135. The method according to any of clauses 131-134, wherein the method further comprises: checking using the consistency rules, the attribute values of the host or link in quarantine for consistency.

136. The method according to any of clauses 131-135, wherein the method further comprises: assessing, using the attribute based policies, if the attribute values of the host or link in quarantine comply with the set of attribute-based policies.

137. The method according to any of clauses 131-136, further comprising: deriving attribute based policies from the attributes of the host or link listed in the quarantine.

138. The method according to clause 137, wherein a new whitelist policy is derived from attribute values derived from protocol messages relating to the host or link in quarantine, wherein a frequency of occurrence of the protocol messages relating to the host or link in quarantine exceeds a whitelisting threshold.

139. The method according to clause 137 or 138 wherein the deriving attribute based policies from the host attributes and link attributes of the data traffic stored in the quarantine comprises:

(re)computing the support to the hypothesis that the host or link in the quarantine is legit or malicious when data traffic related to host and/or links in quarantine is observed, If the support to the hypothesis that the host or link in quarantine is legit exceeds a whitelist threshold, removing the host or link from the quarantine and use the data traffic related to the host or link to extract new whitelist policies, If the support to the hypothesis that a host/link in quarantine is malicious exceeds a blacklist threshold, raising an alert and using the data traffic related to the host or link to extract new blacklist policies, updating the current policies using the extracted new whitelist or blacklist policies.

140. The method according to clause 139, wherein the (re)computing the support to the hypothesis that the host or link in the quarantine is legit or malicious comprises:

computing a similarity of the host or link in quarantine with another host or link.

141. The method according to clause 139 or 140, wherein the using the data traffic related to the host or link to extract new whitelist policies respectively the using the data traffic related to the host or link to extract new blacklist policies comprises:

learning the whitelist policies respectively the blacklist policies in accordance with any of the preceding clauses.

142. The method according to any one of the preceding clauses 101-141, comprising at least one of:

wherein the attribute values derived from the extracted protocol field values describe protocol generic features of the one of the first host, the second host and the link, and wherein the attribute based policies comprise declarative policies.

143. The method according to any one of the preceding clauses 101-142, wherein the quarantine stores a list of hosts, links or combinations of hosts and links for which no judgement has been made regarding the host respectively link being legit or malicious.

144. An intrusion detection system configured to perform the method according to any of the preceding clauses 101-143.

145. A data communication network comprising the intrusion detection system according to clause 144.

146. An apparatus comprising the intrusion detection system according to clause 44.

The following numbered causes 201-244 form part of the description:

201. A method of detecting anomalous behaviour in data traffic on a data communication network, a first host and a second host being connected to the data communication network, the data traffic on the data communication network providing a link (forming a network communication) between the first host and the second host, the method comprising:

a) parsing the data traffic to extract protocol field values of a protocol message of the data traffic;

b) deriving, from the extracted protocol field values, attribute values of attributes of one of the first host, the second host, and the link;

c) selecting from a set of models, a model relating to the one of the first host, the second host, and the link, wherein the selected model comprises a plurality of attributes to describe the one of the first host, the second host, and the link;

d) updating the selected model with the derived attribute values, if the derived attribute values are not featured in the selected model relating to the one of the first host, the second host and the link;

e) assessing if the updated, selected model complies with a set of attribute based policies, each attribute based policy of the set of attribute based policies defining a security constraint of the data communication network based on at least one of the attributes of the first host, the second host, or the link; and f) generating an alert signal in case the attribute based policies indicate that the updated selected model violates at least one of the attribute based policies, wherein, in case the protocol message carries information about a host or link for which no model is available, the respective host or link is listed in a quarantine, the method further comprising:

deriving attribute values relating to the host or link listed in the quarantine, and deriving attribute based policies from the attributes of the host or link listed in the quarantine.

202. The method according to clause 201, wherein a new whitelist policy is derived from attribute values derived from protocol messages relating to the host or link in quarantine, wherein a frequency of occurrence of the protocol messages relating to the host or link in quarantine exceeds a whitelisting threshold.

203. The method according to clause 201 or 202 wherein the deriving attribute based policies from the attributes of the data traffic listed in the quarantine comprises:

(re)computing a support to a hypothesis that the host or link in the quarantine is legit or malicious when data traffic related to host and/or links in quarantine is observed If the support to the hypothesis that the host or link in quarantine is legit exceeds a whitelist threshold, removing the host or link from the quarantine and use the data traffic related to the host or link to extract new whitelist policies If the support to the hypothesis that a host/link in quarantine is malicious exceeds a blacklist threshold, raising an alert and using the data traffic related to the host or link to extract new blacklist policies updating the current policies using the extracted new whitelist or blacklist policies.

204. The method according to clause 203, wherein the (re)computing the support to the hypothesis that the host or link in the quarantine is legit or malicious comprises:

computing a similarity of the host or link in quarantine with another host or link.

205. The method according to clause 203 or 204, wherein the using the data traffic related to the host or link to extract new whitelist policies respectively the using the data traffic related to the host or link to extract new blacklist policies comprises:

learning the whitelist policies respectively the blacklist policies from the attributes of the host or link listed in the quarantine.

206. The method according to any of the preceding clauses 201-205, further comprising: calculating, from the attribute values relating to the host or link listed in the quarantine, the support to the hypothesis that the host or link listed in the quarantine is legit, and calculating, from the attribute values relating to the host or link listed in the quarantine, the support to the hypothesis that the host or link listed in the quarantine is malicious, and, optionally, updating the set of attribute based policies in case the support to the hypothesis that the host or link listed in the quarantine is legit or the support to the hypothesis that the host or link listed in the quarantine is malicious exceeds a predetermined threshold.

207. The method according to clause 206, wherein the calculating the supports to the hypotheses is repeated when the attribute values relating to the host or link listed in the quarantine have been updated.

208. The method according to any of the preceding clauses 201-207, wherein the quarantine comprises, for the hosts and/or links listed in the quarantine:

an identification of the host or link, a list of known attribute values of the host or link, a support to a hypothesis that the host or link is legit, a support to a hypothesis that the host or link is malicious, an identification of data traffic used to determine the support to the hypotheses.

209. The method according to any of the preceding clauses 201-208, wherein the method further comprises:

checking using the consistency rules, the attribute values of the host or link in quarantine for consistency.

210. The method according to any of the preceding clauses 201-209, wherein the method further comprises:

assessing, using the attribute based policies, if the attribute values of the host or link in quarantine comply with the set of attribute-based policies.

211. The method according to any of the preceding clauses 201-210, wherein at least one of the attributes is a semantic attribute, the semantic attribute expressing a semantic meaning for the one of the first host, the second host, and the link.

212. The method according to any of the preceding clauses 201-211, wherein the at least one semantic attribute value is derived from a combination of protocol field values obtained from at least two protocol messages transmitted over the data communication network at different points in time.

213. The method according to any of the preceding clauses 201-212, wherein the set of models comprises a model for the first host, a model for the second host and a model for the link, wherein each of the models comprises at least one semantic attribute.

214. The method according to any of the preceding clauses 201-213, wherein the policies each define an outcome in case a condition is met, the condition being defined in terms of a respective at least one of the attributes having a defined attribute value, the outcome of the attribute based policies indicating if the selected model is allowable or not allowable 215. The method according to any of the preceding clauses 201-214, wherein the condition of each policy comprises at least one semantic attribute value.

216. The method according to any of the preceding clauses 201-215, wherein b) comprises applying rules to the protocol field values, the rules assigning attribute values to attributes based on the protocol field values.

217. The method according to any of the preceding clauses 201-216, wherein b) comprises direct mapping protocol fields on attribute values.

218. The method according to any of the preceding clauses 201-217, wherein b) comprises applying a heuristic to the data traffic and deriving the semantic attribute value using the heuristic.

219. The method according to any of the preceding clauses 201-218, wherein b) comprises applying a classifier to the data traffic and deriving the semantic attribute value using the classifier.

220. The method according to clause 219, further comprising determining a level of confidence of the classifier and wherein the attribute value is only derived from the classifier when the level of confidence is above a predetermined confidence level.

221. The method according to any of clauses 218-220, wherein the attribute value obtained using the heuristic has priority over the attribute value obtained using the classifier.

222. The method according to any of the preceding clauses 201-221, wherein no stimulus is injected into the data communication network.

223. The method according to any of the preceding clauses 201-222, wherein steps b), c), d) and e) are performed for the first host, for the second host and for the link, the set of models comprising a model relating to the first host, a model relating to the second host and a model relating to the link, the attribute based policies of the set of attribute based policies defining conditions in terms of the attributes of the first host, the attributes of the second host and the attributes of the link.

224. The method according to any of the preceding clauses 201-223, wherein the set of attribute based policies comprises whitelist policies, the outcome of the whitelist policies indicating if the selected model is allowable.

225. The method according to any of the preceding clauses 201-224, wherein the set of attribute based policies comprises blacklist policies, the outcome of the blacklist policies indicating if the selected model is not allowable.

226. The method according to any of the preceding clauses 201-225, further comprising providing a consistency rule, the consistency rule defining consistent combinations of at least two attribute values of attributes of the model relating to the one of the first host, the second host, and the link, comprising verifying, on the basis of the attribute values of the attributes derived from the monitored data traffic, if the monitored data traffic complies to the consistency rule, storing the data traffic relating to the one of the first host, the second host and the link in a quarantine in case the data traffic relating to the one of the first host, the second host and the link does not comply to the consistency rule.

227. The method according to clause 226, wherein the detecting, on the basis of the values of the attributes derived from the monitored data traffic, if the monitored data traffic complies to the consistency rule, is performed before step e).

228. The method according to clause 226 or 227, wherein the consistency rule includes at least one of a time of occurrence of the data traffic and a location of occurrence of the data traffic.

229. The method according to any of clauses 226-228 wherein the consistency rule relating to the first host further comprises an attribute of another host, preferably an attribute of the second host.

230. The method according to any of clauses 226-229, wherein a group of hosts is defined, wherein the method comprises determining if the host to which the attributes relate, is comprised in the group, and applying the consistency rule in case the host to which the attributes relate, is comprised in the group.

231. The method according to any of clauses 226-230, wherein the consistency rules are learned using machine learning, preferably using association rules.

232. The method according to any of the preceding clauses 201-231, wherein the attribute based policy further expresses at least one of a time of performing the action, and a link via which the action is performed.

233. The method according to any of the preceding clauses 201-232, comprising learning the attribute based policy from the data traffic, the learning comprising, in a learning phase:

monitoring the data traffic, deriving host attributes and link attributes from the monitored data traffic, transforming the data traffic into a dataset of attribute-based transactions, generating rules by taking into account a frequency of item sets of the host attribute values and link attribute values in the dataset, each one of the rules comprising an antecedent defining a condition and a consequent defining an action, determining for each rule a level of confidence that specifies how often the rule appears to be true, and a level of support that specifies how often the item set underlying the rule appears in the dataset, selecting rules based on the level of support and the level of confidence, translating the rules into the attribute based policy by defining the attribute-based policy condition by joining the antecedent and the consequent of the selected rules, and defining the attribute-based policy action based on the level of support and/or the level of confidence.

234. The method according to clause 233, wherein the selecting rules based on the level of support and the level of confidence comprises:

selecting, for whitelist policies, rules having the level of confidence above a predetermined positive level of confidence and having a level of support above a predetermined level of support.

235. The method according to clause 233 or 234, wherein the selecting rules based on the level of support and the level of confidence comprises:

selecting, for blacklist policies, rules having the level of confidence below a predetermined negative level of confidence and having a level of support above a predetermined level of support.

236. The method according to any of clauses 233-235, wherein the generating rules from the host attributes and the link attributes comprises applying association rules to the host attributes and the link attributes.

237. The method according to any of clauses 233-236, wherein the generating rules from the host attributes and the link attributes comprises applying frequent items set extraction to the host attributes and the link attributes.

238. The method according to any of clauses 233-237, wherein translating the rules into the attribute based policy further comprises:

reducing the number of policies by removing redundant policies, a policy being redundant if its condition includes the whole condition of another policy.

in case of conflict where two policies share the same condition while the two policies comprise different actions, remove the policy that has less support and confidence.

239. The method according to any of the preceding clauses, wherein the set of attribute based policies comprises the whitelist policies, the outcome of the whitelist policies indicating if the selected model is allowable, and wherein, in case the model relating to the first host, the second host or the link cannot be matched to any of the whitelist policies, the data communication relating to the respective one of the first host, the second host or link is listed in a quarantine.

240. The method according to any one of the preceding clauses 201-239, comprising at least one of:

wherein the attribute values derived from the extracted protocol field values describe protocol generic features of the one of the first host, the second host and the link, and wherein the attribute based policies comprise declarative policies.

241. The method according to any one of the preceding clauses 201-240, wherein the quarantine stores a list of hosts, links or combinations of hosts and links for which no judgement has been made regarding the host respectively link being legit or malicious.

242. An intrusion detection system configured to perform the method according to any of the preceding clauses 201-241.

243. A data communication network comprising the intrusion detection system according to clause 242.

244. An apparatus comprising the intrusion detection system according to clause 242.

The following numbered causes 301-344 form part of the description:

301. A method of detecting anomalous behaviour in data traffic on a data communication network, a first host and a second host being connected to the data communication network, the data traffic on the data communication network providing a link (forming a network communication) between the first host and the second host, the method comprising:

a) parsing the data traffic to extract protocol field values of a protocol message of the data traffic;

b) deriving, from the extracted protocol field values, attribute values of attributes of one of the first host, the second host, and the link;

c) selecting from a set of models, a model relating to the one of the first host, the second host, and the link, wherein the selected model comprises a plurality of attributes to describe the one of the first host, the second host, and the link;

d) updating the selected model with the derived attribute values, if the derived attribute values are not featured in the selected model relating to the one of the first host, the second host and the link;

e) assessing if the updated, selected model complies with a set of attribute based policies, each attribute based policy of the set of attribute based policies defining a security constraint of the data communication network based on at least one of the attributes of the first host, the second host or, the link; and f) generating an alert signal in case the attribute based policies indicate that the updated selected model violates at least one of the attribute based policies, wherein, in case the protocol message carries information about a host or link for which no model is available, the respective host or link is listed in a quarantine, further comprising:

deriving attribute values relating to the host or link listed in the quarantine, calculating, from the attribute values relating to the host or link listed in the quarantine, a support to a hypothesis that the host or link listed in the quarantine is legit, and calculating, from the attribute values relating to the host or link listed in the quarantine, a support to a hypothesis that the host or link listed in the quarantine is malicious, and, optionally, updating the set of attribute based policies in case the support to the hypothesis that the host or link listed in the quarantine is legit or the support to the hypothesis that the host or link listed in the quarantine is malicious exceeds a predetermined threshold.

302. The method according to clause 301, wherein the calculating the supports to the hypotheses is repeated when the attribute values relating to the host or link listed in the quarantine have been updated.

303. The method according to clause 301 or 302, wherein the quarantine comprises, for the hosts and/or links listed in the quarantine:

an identification of the host or link, a list of known attribute values of the host or link, a support to a hypothesis that the host or link is legit, a support to a hypothesis that the host or link is malicious, an identification of data traffic used to determine the support to the hypotheses.

304. The method according to any of the preceding clauses 301-303, wherein the method further comprises:

checking using the consistency rules, the attribute values of the host or link in quarantine for consistency.

305. The method according to any of the preceding clauses 301-304, wherein the method further comprises:

assessing, using the attribute based policies, if the attribute values of the host or link in quarantine comply with the set of attribute-based policies.

306. The method according to any of the preceding clauses 301-305, further comprising: deriving attribute based policies from the attributes of the host or link listed in the quarantine.

307. The method according to clause 306, wherein a new whitelist policy is derived from attribute values derived from protocol messages relating to the host or link in quarantine, wherein a frequency of occurrence of the protocol messages relating to the host or link in quarantine exceeds a whitelisting threshold.

308. The method according to clause 306 or 307 wherein the deriving attribute based policies from the attributes of the host or link listed in the quarantine comprises:

(re)computing the support to the hypothesis that the host or link in the quarantine is legit or malicious when data traffic related to host and/or links in quarantine is observed If the support to the hypothesis that the host or link in quarantine is legit exceeds a whitelist threshold, removing the host or link from the quarantine and use the data traffic related to the host or link to extract new whitelist policies If the support to the hypothesis that a host/link in quarantine is malicious exceeds a blacklist threshold, raising an alert and using the data traffic related to the host or link to extract new blacklist policies updating the current policies using the extracted new whitelist or blacklist policies.

309. The method according to clause 308, wherein the (re)computing the support to the hypothesis that the host or link in the quarantine is legit or malicious comprises:

computing a similarity of the host or link in quarantine with another host or link.

310. The method according to clause 308 or 309, wherein the using the data traffic related to the host or link to extract new whitelist policies respectively the using the data traffic related to the host or link to extract new blacklist policies comprises:

learning the whitelist policies respectively the blacklist policies from the attributes of the host or link listed in the quarantine.

311. The method according to any of the preceding clauses 301-310, wherein at least one of the attributes is a semantic attribute, the semantic attribute expressing a semantic meaning for the one of the first host, the second host, and the link.

312. The method according to any of the preceding clauses 301-311, wherein the at least one semantic attribute value is derived from a combination of protocol field values obtained from at least two protocol messages transmitted over the data communication network at different points in time.

313. The method according to any of the preceding clauses 301-312, wherein the set of models comprises a model for the first host, a model for the second host and a model for the link, wherein each of the models comprises at least one semantic attribute.

314. The method according to any of the preceding clauses 301-313, wherein the policies each define an outcome in case a condition is met, the condition being defined in terms of a respective at least one of the attributes having a defined attribute value, the outcome of the attribute based policies indicating if the selected model is allowable or not allowable 315. The method according to any of the preceding clauses 301-314, wherein the condition of each policy comprises at least one semantic attribute value.

316. The method according to any of the preceding clauses 301-315, wherein b) comprises applying rules to the protocol field values, the rules assigning attribute values to attributes based on the protocol field values.

317. The method according to any of the preceding clauses 301-316, wherein b) comprises direct mapping protocol fields on attribute values.

318. The method according to any of the preceding clauses 301-317, wherein b) comprises applying a heuristic to the data traffic and deriving the semantic attribute value using the heuristic.

319. The method according to any of the preceding clauses 301-318, wherein b) comprises applying a classifier to the data traffic and deriving the semantic attribute value using the classifier.

320. The method according to clause 319, further comprising determining a level of confidence of the classifier and wherein the attribute value is only derived from the classifier when the level of confidence is above a predetermined confidence level.

321. The method according to any of clauses 318-320, wherein the attribute value obtained using the heuristic has priority over the attribute value obtained using the classifier.

322. The method according to any of the preceding clauses 301-321, wherein no stimulus is injected into the data communication network.

323. The method according to any of the preceding clauses 301-322, wherein steps b), c), d) and e) are performed for the first host, for the second host and for the link, the set of models comprising a model relating to the first host, a model relating to the second host and a model relating to the link, the attribute based policies of the set of attribute based policies defining conditions in terms of the attributes of the first host, the attributes of the second host and the attributes of the link.

324. The method according to any of the preceding clauses 301-323, wherein the set of attribute based policies comprises whitelist policies, the outcome of the whitelist policies indicating if the selected model is allowable.

325. The method according to any of the preceding clauses 301-324, wherein the set of attribute based policies comprises blacklist policies, the outcome of the blacklist policies indicating if the selected model is not allowable.

326. The method according to any of the preceding clauses 301-325, further comprising providing a consistency rule, the consistency rule defining consistent combinations of at least two attribute values of attributes of the model relating to the one of the first host, the second host, and the link, comprising verifying, on the basis of the attribute values of the attributes derived from the monitored data traffic, if the monitored data traffic complies to the consistency rule, storing the data traffic relating to the one of the first host, the second host and the link in a quarantine in case the data traffic relating to the one of the first host, the second host and the link does not comply to the consistency rule.

327. The method according to clause 326, wherein the verifying, on the basis of the attributes derived from the monitored data traffic, if the monitored data traffic complies to the consistency rule, is performed before step e).

328. The method according to clause 326 or 327, wherein the consistency rule includes at least one of a time of occurrence of the data traffic and a location of occurrence of the data traffic.

329. The method according to any of clauses 326-328 wherein the consistency rule relating to the first host further comprises an attribute of another host, preferably an attribute of the second host.

330. The method according to any of clauses 326-329, wherein a group of hosts is defined, wherein the method comprises determining if the host to which the attributes relate, is comprised in the group, and applying the consistency rule in case the host to which the attributes relate, is comprised in the group.

331. The method according to any of clauses 326-330, wherein the consistency rules are learned using machine learning, preferably using association rules.

332. The method according to any of the preceding clauses 301-331, wherein the attribute based policy further expresses at least one of a time of performing an action, and a link via which the action is performed.

333. The method according to any of the preceding clauses 301-332, comprising learning the attribute based policy from the data traffic, the learning comprising, in a learning phase:

monitoring the data traffic, deriving host attributes and link attributes from the monitored data traffic, transforming the data traffic into a dataset of attribute-based transactions, generating rules by taking into account a frequency of item sets of the host attribute values and link attribute values in the dataset, each one of the rules comprising an antecedent defining a condition and a consequent defining an action, determining for each rule a level of confidence that specifies how often the rule appears to be true, and a level of support that specifies how often the item set underlying the rule appears in the dataset, selecting rules based on the level of support and the level of confidence, translating the rules into the attribute based policy by defining the attribute-based policy condition by joining the antecedent and the consequent of the selected rules, and defining the attribute-based policy action based on the level of support and/or the level of confidence.

334. The method according to clause 333, wherein the selecting rules based on the level of support and the level of confidence comprises:

selecting, for whitelist policies, rules having the level of confidence above a predetermined positive level of confidence and having a level of support above a predetermined level of support.

335. The method according to clause 333 or 334, wherein the selecting rules based on the level of support and the level of confidence comprises:

selecting, for blacklist policies, rules having the level of confidence below a predetermined negative level of confidence and having a level of support above a predetermined level of support.

336. The method according to any of clauses 333-335, wherein the generating rules from the host attributes and the link attributes comprises applying association rules to the host attributes and the link attributes.

337. The method according to any of clauses 333-336, wherein the generating rules from the host attributes and the link attributes comprises applying frequent items set extraction to the host attributes and the link attributes.

338. The method according to any of clauses 333-337, wherein translating the rules into the attribute based policy further comprises:

reducing the number of policies by removing redundant policies, a policy being redundant if its condition includes the whole condition of another policy.

in case of conflict where two policies share the same condition while the two policies comprise different actions, remove the policy that has less support and confidence.

339. The method according to any of the preceding clauses 301-338, wherein the set of attribute based policies comprises the whitelist policies, the outcome of the whitelist policies indicating if the selected model is allowable, and wherein, in case the model relating to the first host, the second host or the link cannot be matched to any of the whitelist policies, the data communication relating to the respective one of the first host, the second host or link is listed in a quarantine.

340. The method according to any one of the preceding clauses 301-339 comprising at least one of:

wherein the attribute values derived from the extracted protocol field values describe protocol generic features of the one of the first host, the second host and the link, and wherein the attribute based policies comprise declarative policies.

341. The method according to any one of the preceding clauses 301-340, wherein the quarantine stores a list of hosts, links or combinations of hosts and links for which no judgement has been made regarding the host respectively link being legit or malicious.

342. An intrusion detection system configured to perform the method according to any of the preceding clauses 301-341.

343. A data communication network comprising the intrusion detection system according to clause 342.

344. An apparatus comprising the intrusion detection system according to clause 342.

The following numbered causes 401-446 form part of the description:

401. A method of detecting anomalous behaviour in data traffic on a data communication network, a first host and a second host being connected to the data communication network, the data traffic on the data communication network providing a link (forming a network communication) between the first host and the second host, the method comprising:

a) parsing the data traffic to extract protocol field values of a protocol message of the data traffic;

b) deriving, from the extracted protocol field values, attribute values of attributes of one of the first host, the second host, and the link;

c) selecting from a set of models, a model relating to the one of the first host, the second host, and the link, wherein the selected model comprises a plurality of attributes to describe the one of the first host, the second host, and the link;

d) updating the selected model with the derived attribute values, if the derived attribute values are not featured in the selected model relating to the one of the first host, the second host and the link;

e) assessing if the updated, selected model complies with a set of attribute based policies, each attribute based policy of the set of attribute based policies defining a security constraint of the data communication network based on at least one of the attributes of the first host, the second host, or the link; and f) generating an alert signal in case the attribute based policies indicate that the updated selected model violates at least one of the attribute based policies, further comprising providing a consistency rule, the consistency rule defining consistent combinations of at least two attribute values of attributes of the model relating to the one of the first host, the second host, and the link, comprising verifying, on the basis of the values of the attributes derived from the monitored data traffic, if the monitored data traffic complies to the consistency rule, storing the data traffic relating to the one of the first host, the second host, and the link in a quarantine in case the data traffic relating to the one of the first host, the second host, and the link does not comply to the consistency rule.

402. The method according to clause 401, wherein the verifying, on the basis of the values of the attributes derived from the monitored data traffic, if the monitored data traffic complies to the consistency rule, is performed before step e).

403. The method according to clause 401 or 402, wherein the consistency rule includes at least one of a time of occurrence of the data traffic and a location of occurrence of the data traffic.

404. The method according to any of the preceding clauses 401-403, wherein the consistency rule relating to the first host comprises an attribute of another host, preferably an attribute of the second host.

405. The method according to any of the preceding clauses 401-404, wherein a group of hosts is defined, wherein the method comprises determining if the host to which the attributes relate, is comprised in the group, and applying the consistency rule in case the host to which the attributes relate, is comprised in the group.

406. The method according to any of the preceding clauses 401-405, wherein the consistency rules are learned using machine learning, preferably using association rules.

407. The method according to any of the preceding clauses 401-406, wherein at least one of the attributes is a semantic attribute, the semantic attribute expressing a semantic meaning for the one of the first host, the second host, and the link.

408. The method according to any of the preceding clauses 401-407, wherein the at least one semantic attribute value is derived from a combination of protocol field values obtained from at least two protocol messages transmitted over the data communication network at different points in time.

409. The method according to any of the preceding clauses 401-408, wherein the set of models comprises a model for the first host, a model for the second host and a model for the link, wherein each of the models comprises at least one semantic attribute.

410. The method according to any of the preceding clauses 401-409, wherein the policies each define an outcome in case a condition is met, the condition being defined in terms of a respective at least one of the attributes having a defined attribute value, the outcome of the attribute based policies indicating if the selected model is allowable or not allowable 411. The method according to any of the preceding clauses 401-410, wherein the condition of each policy comprises at least one semantic attribute value.

412. The method according to any of the preceding clauses 401-411, wherein b) comprises applying rules to the protocol field values, the rules assigning attribute values to attributes based on the protocol field values.

413. The method according to any of the preceding clauses 401-412, wherein b) comprises direct mapping protocol fields on attribute values.

414. The method according to any of the preceding clauses 401-413, wherein b) comprises applying a heuristic to the data traffic and deriving the semantic attribute value using the heuristic.

415. The method according to any of the preceding clauses 401-414, wherein b) comprises applying a classifier to the data traffic and deriving the semantic attribute value using the classifier.

416. The method according to clause 415, further comprising determining a level of confidence of the classifier and wherein the attribute value is only derived from the classifier when the level of confidence is above a predetermined confidence level.

417. The method according to any of clauses 414-416, wherein the attribute value obtained using the heuristic has priority over the attribute value obtained using the classifier.

418. The method according to any of the preceding clauses 401-417, wherein no stimulus is injected into the data communication network.

419. The method according to any of the preceding clauses 401-418, wherein steps b), c), d) and e) are performed for the first host, for the second host and for the link, the set of models comprising a model relating to the first host, a model relating to the second host and a model relating to the link, the attribute based policies of the set of attribute based policies defining conditions in terms of the attributes of the first host, the attributes of the second host and the attributes of the link.

420. The method according to any of the preceding clauses 401-419, wherein the set of attribute based policies comprises whitelist policies, the outcome of the whitelist policies indicating if the selected model is allowable.

421. The method according to any of the preceding clauses 401-420, wherein the set of attribute based policies comprises blacklist policies, the outcome of the blacklist policies indicating if the selected model is not allowable.

422. The method according to any of the preceding clauses 401-421, wherein the attribute based policy further expresses at least one of a time of performing an action, and a link via which the action is performed.

423. The method according to any of the preceding clauses 401-422, comprising learning the attribute based policy from the data traffic, the learning comprising, in a learning phase:

monitoring the data traffic, deriving host attributes and link attributes from the monitored data traffic, transforming the data traffic into a dataset of attribute-based transactions, generating rules by taking into account a frequency of item sets of the host attribute values and link attribute values in the dataset, each one of the rules comprising an antecedent defining a condition and a consequent defining an action, determining for each rule a level of confidence that specifies how often the rule appears to be true, and a level of support that specifies how often the item set underlying the rule appears in the dataset, selecting rules based on the level of support and the level of confidence, translating the rules into the attribute based policy by defining the attribute-based policy condition by joining the antecedent and the consequent of the selected rules, and defining the attribute-based policy action based on the level of support and/or the level of confidence.

424. The method according to clause 423, wherein the selecting rules based on the level of support and the level of confidence comprises:

selecting, for whitelist policies, rules having the level of confidence above a predetermined positive level of confidence and having a level of support above a predetermined level of support.

425. The method according to clause 423 or 424, wherein the selecting rules based on the level of support and the level of confidence comprises:

selecting, for blacklist policies, rules having the level of confidence below a predetermined negative level of confidence and having a level of support above a predetermined level of support.

426. The method according to any of clauses 423-425, wherein the generating rules from the host attributes and the link attributes comprises applying association rules to the host attributes and the link attributes.

427. The method according to any of clauses 423-426, wherein the generating rules from the host attributes and the link attributes comprises applying frequent items set extraction to the host attributes and the link attributes.

428. The method according to any of clauses 423-427, wherein translating the rules into the attribute based policy further comprises:

reducing the number of policies by removing redundant policies, a policy being redundant if its condition includes the whole condition of another policy.

in case of conflict where two policies share the same condition while the two policies comprise different actions, remove the policy that has less support and confidence.

429. The method according to any of the preceding clauses 401-428, wherein the set of attribute based policies comprises the whitelist policies, the outcome of the whitelist policies indicating if the selected model is allowable, and wherein, in case the model relating to the first host, the second host or the link cannot be matched to any of the whitelist policies, the data communication relating to the respective one of the first host, the second host or link is listed in a quarantine.

430. The method according to any of the preceding clauses 401-429, wherein, in case the protocol message carries information about a host or link for which no model is available, the respective host or link is listed in a quarantine.

431. The method according to clause 430, further comprising:

deriving attribute values relating to the host or link listed in the quarantine.

432. The method according to clause 431, further comprising:

calculating, from the attribute values relating to the host or link listed in the quarantine, a support to a hypothesis that the host or link listed in the quarantine is legit, and calculating, from the attribute values relating to the host or link listed in the quarantine, a support to a hypothesis that the host or link listed in the quarantine is malicious, and, optionally, updating the set of attribute based policies in case the support to the hypothesis that the host or link listed in the quarantine is legit or the support to the hypothesis that the host or link listed in the quarantine is malicious exceeds a predetermined threshold.

433. The method according to clause 432, wherein the calculating the supports to the hypotheses is repeated when the attribute values relating to the host or link listed in the quarantine have been updated.

434. The method according to any of clauses 430-433, wherein the quarantine comprises, for the hosts and/or links listed in the quarantine:

an identification of the host or link, a list of known attribute values of the host or link, a support to a hypothesis that the host or link is legit, a support to a hypothesis that the host or link is malicious, an identification of data traffic used to determine the support to the hypotheses.

435. The method according to any of clauses 431-434, wherein the method further comprises: checking using the consistency rules, the attribute values of the host or link in quarantine for consistency.

436. The method according to any of clauses 431-435, wherein the method further comprises: assessing, using the attribute based policies, if the attribute values of the host or link in quarantine comply with the set of attribute-based policies.

437. The method according to any of clauses 431-436, further comprising:

deriving attribute based policies from the attributes of the host or link listed in the quarantine.

438. The method according to clause 437, wherein a new whitelist policy is derived from attribute values derived from protocol messages relating to the host or link in quarantine, wherein a frequency of occurrence of the protocol messages relating to the host or link in quarantine exceeds a whitelisting threshold.

439. The method according to clause 437 or 438 wherein the deriving attribute based policies from the attributes of the host or link listed in the quarantine comprises:

(re)computing the support to the hypothesis that the host or link in the quarantine is legit or malicious when data traffic related to host and/or links in quarantine is observed If the support to the hypothesis that the host or link in quarantine is legit exceeds a whitelist threshold, removing the host or link from the quarantine and using the data traffic related to the host or link to extract new whitelist policies If the support to the hypothesis that a host/link in quarantine is malicious exceeds a blacklist threshold, raising an alert and using the data traffic related to the host or link to extract new blacklist policies updating the current policies using the extracted new whitelist or blacklist policies.

440. The method according to clause 439, wherein the (re)computing the support to the hypothesis that the host or link in the quarantine is legit or malicious comprises:
   computing a similarity of the host or link in quarantine with another host or link.
441. The method according to clause 439 or 440, wherein the using the data traffic related to the host or link to extract new whitelist policies respectively the using the data traffic related to the host or link to extract new blacklist policies comprises:
learning the whitelist policies respectively the blacklist policies in accordance with any of clauses 423-428.
442. The method according to any one of the preceding clauses comprising at least one of:
   wherein the attribute values derived from the extracted protocol field values describe protocol generic features of the one of the first host, the second host and the link, and
   wherein the attribute based policies comprise declarative policies.
443. The method according to any one of the preceding clauses 401-442, wherein the quarantine stores a list of hosts, links or combinations of hosts and links for which no judgement has been made regarding the host respectively link being legit or malicious.
444. An intrusion detection system configured to perform the method according to any of the preceding clauses 401-443.
445. A data communication network comprising the intrusion detection system according to clause 444.
446. An apparatus comprising the intrusion detection system according to clause 444.

What is claimed is:

1. A method of detecting anomalous behavior in data traffic on a data communication network, the method comprising:

deriving, from data traffic of the data communication network, attribute values of one of a first host, a second host, or a link between the first host and the second host, including applying a classifier to the data traffic and determining a semantic attribute value using the classifier;

selecting, from a plurality of models comprising models of hosts and links, a model corresponding to the one of the first host, the second host, or the link;

updating the model with the derived attribute values, wherein the model comprises a plurality of attributes that characterize the one of the first host, the second host, or the link;

determining that the model does not comply with an attribute-based policy that defines a security constraint of the data communication network; and generating an alert signal indicating that the updated model violates the attribute-based policy or denying the data traffic or quarantining the first host, the second host or the link.

2. The method according to claim 1, wherein the first host and the second host are connected to the data communication network, and wherein the link comprises a network communication between the first host and the second host.

3. The method according to claim 1, wherein deriving the attribute values of attributes of one of the first host, the second host and the link comprises applying a heuristic to the data traffic and deriving a second semantic attribute value using the heuristic.

4. The method according to claim 1, further comprising determining a level of confidence of the classifier and wherein the semantic attribute value is only derived from the classifier when the level of confidence is above a threshold.

5. The method according to claim 3, wherein the second semantic attribute value obtained using the heuristic has priority over the semantic attribute value obtained using the classifier.

6. The method according to claim 1, wherein no stimulus is injected into the data communication network.

7. The method according to claim 1, wherein the attribute-based policy is conditioned on at least one semantic attribute value.

8. The method according to claim 1, wherein the attribute-based policy further expresses at least one of a time of performing an action, or which link the action is to be performed.

9. The method according to claim 1, further comprising:

generating rules from host attributes and link attributes by applying association rules to the host attributes and the link attributes.

10. The method according to claim 9, wherein generating rules from the host attributes and the link attributes comprises applying frequent items set extraction to the host attributes and the link attributes.

11. The method according to claim 1, further comprising:

reducing a number of policies by removing redundant policies, a policy being redundant in response to condition of the policy including the whole condition of another policy; and in case of conflict where two policies share the same condition while the two policies comprise different actions, removing the policy that has less support and confidence.

12. The method according to claim 1, wherein, in case a protocol message of the data traffic carries information about a host or link for which no model is available, the host or link for which no model is available is listed in a quarantine.

13. The method according to claim 12, wherein the quarantine stores a list of hosts, links or combinations of hosts and links for which no judgement has been made regarding the whether the hosts, links or combinations of hosts and links are legitimate or malicious.

14. The method according to claim 12, further comprising:

deriving attribute values relating to the host or link listed in the quarantine.

15. The method according to claim 12, wherein the quarantine comprises, for the hosts or links listed in the quarantine at least one of:

an identification of the host or link;

a list of known attribute values of the host or link;

a support to a hypothesis that the host or link is legitimate;

a support to a hypothesis that the host or link is malicious; or an identification of data traffic used to determine the support to the hypotheses.

16. An intrusion detection system comprising:

a memory; and a processing device, operatively coupled to the memory, to:

derive, from data traffic of a data communication network, attribute values of one of a first host, a second host, or a link between the first host and the second host, including applying a classifier to the data traffic and determining a semantic attribute value using the classifier;

select, from a plurality of models comprising models of hosts and links, a model corresponding to the one of the first host, the second host, or the link; and update the model relating to the one of the first host, the second host, or the link, with the derived attribute values, wherein the model comprises a plurality of attributes that characterize the one of the first host, the second host, or the link.

17. The intrusion detection system of claim 16, wherein the processing device is further to:

assess whether the updated model complies with an attribute-based policy defining a security constraint of the data communication network; and generate an alert signal in response to assessing that the model violates the attribute-based policy or denying the data traffic or quarantining the first host, the second host or the link.

18. A non-transitory machine program comprising instructions that when executed by a processing device, cause the processing device to:

derive, from data traffic of a data communication network, attribute values of one of a first host, a second host, or a link between the first host and the second host, including to apply a classifier to the data traffic and determining a semantic attribute value using the classifier;

select, from a plurality of models comprising models of hosts and links, a model corresponding to the one of the first host, the second host, or the link; and update the model relating to the one of the first host, the second host, or the link, with the derived attribute values, wherein the model comprises a plurality of attributes that semantically describe the one of the first host, the second host, or the link.

19. The non-transitory machine program of claim 18, wherein the instructions further cause the processing device to:

assess whether the updated model complies with an attribute-based policy that defines a security constraint of the data communication network; and generate an alert signal in response to assessing that the updated model violates the attribute-based policy or denying the data traffic or quarantining the first host, the second host or the link.

* * * * *